US012658756B2

(12) United States Patent
Huang et al.

(10) Patent No.: US 12,658,756 B2
(45) Date of Patent: Jun. 16, 2026

(54) DC BRUSHLESS MOTOR

(71) Applicant: Greenworks (Jiangsu) Co., Ltd.,
Changzhou (CN)

(72) Inventors: Wei Huang, Changzhou (CN); **Lin
Zhang, Changzhou (CN); Changcun
Wei, Changzhou (CN); Qilin Wang**,
Changzhou (CN); Fajia Yang,
Changzhou (CN)

(73) Assignee: Greenworks (Jiangsu) Co., Ltd.,
Changzhou (CN)

( * ) Notice: Subject to any disclaimer, the term of this
patent is extended or adjusted under 35
U.S.C. 154(b) by 196 days.

(21) Appl. No.: 18/531,695

(22) Filed: Dec. 7, 2023

(65) Prior Publication Data

US 2024/0106292 A1 Mar. 28, 2024

Related U.S. Application Data

(63) Continuation of application No.
PCT/CN2022/099043, filed on Jun. 16, 2022.

(30) Foreign Application Priority Data

| Jun. 17, 2021 | (CN) | ........................ | 202121321310.5 |
| Jun. 17, 2021 | (CN) | ........................ | 202121356746.8 |
| Jun. 17, 2021 | (CN) | ........................ | 202121605672.7 |

(51) Int. Cl.
| *H02K 3/28* | (2006.01) |
| *H02K 3/38* | (2006.01) |
| *H02K 3/50* | (2006.01) |
| *H02K 11/215* | (2016.01) |

(52) U.S. Cl.
CPC ................. *H02K 3/28* (2013.01); *H02K 3/38*
(2013.01); *H02K 3/50* (2013.01); *H02K
11/215* (2016.01); *H02K 2203/03* (2013.01);
*H02K 2203/06* (2013.01)

(58) Field of Classification Search
CPC ............................ H02K 5/22; H02K 2203/09
USPC ......................................... 310/68 R, 71, 418
See application file for complete search history.

(56) References Cited

U.S. PATENT DOCUMENTS

| 2014/0077638 | A1* | 3/2014 | Nakai | .................... | H02K 15/02 |
| | | | | | 310/71 |
| 2018/0262092 | A1 | 9/2018 | Beyerl et al. | | |
| 2020/0099270 | A1* | 3/2020 | Kato | ....................... | F16H 61/32 |

(Continued)

FOREIGN PATENT DOCUMENTS

| CN | 208424164 | 1/2019 |
| CN | 109639008 | 4/2019 |
| CN | 210640770 | 5/2020 |

(Continued)

*Primary Examiner* — Oluseye Iwarere
*Assistant Examiner* — Minki Chang

(57) ABSTRACT

A DC brushless motor is provided, which includes a housing, a motor assembly, a control board and a dividing plate. Wherein, the motor assembly is arranged in the housing, and a connecting terminal is arranged on it. The control board is arranged in the housing and electrically connected with the connecting terminal. The dividing plate is arranged in the housing and is used to divide the motor assembly from the control board. The disclosure is used to solve a problem of complicated internal wiring of a motor caused by a division of the motor and a controller of the conventional DC brushless motor.

14 Claims, 29 Drawing Sheets

(56) References Cited

U.S. PATENT DOCUMENTS

2020/0336037 A1 * 10/2020 Naitou ..................... H02K 5/22

FOREIGN PATENT DOCUMENTS

| | | |
|---|---|---|
| CN | 211958875 | 11/2020 |
| CN | 215071978 U | 12/2021 |
| CN | 215733740 U | 2/2022 |
| CN | 215733832 U | 2/2022 |
| EP | 3770429 A1 | 1/2021 |
| JP | 2014169079 | 9/2014 |
| WO | 2020015360 A1 | 1/2020 |

* cited by examiner

3112

31125

31134

3113

311320

31131

31121

31123

31125

3112

3110

31101

31102

3211

31

32

3211

3230

3218

3210

3216

3215

3217

3218

3210

3217

DC BRUSHLESS MOTOR

CROSS REFERENCE TO RELATED APPLICATION

The present application claims the priority of the following Chinese patent applications: serial No. 202121321310.5, filed Jun. 17, 2021, serial No. 202121356746.8, filed Jun. 17, 2021, and serial No. 202121605672.7, filed Jul. 15, 2021; the disclosures of which are hereby incorporated by reference herein in their entireties for all purposes.

TECHNICAL FIELD

The disclosure relates to a field of DC motors, specifically to a DC brushless motor.

BACKGROUND

The DC brushless motor is composed of a motor main body and a controller, which is a typical electromechanical integration product. Wherein, the controller is composed of power electronic devices and integrated circuits, and its functions are: accepting the start, stop and braking signals of the motor to control the start, stop and braking of the motor, accepting position sensor signal and forward and reverse rotation signal to generate continuous torque; accepting the speed command and speed feedback signal to control and adjust the rotating speed, providing a protection and display and much more.

At present, a mounting method of the DC brushless motors on the market is as follows: the motor is arranged in a space, the controller is arranged outside the motor housing, and the two are connected by the wires, so the wiring groove needs to be arranged between the motor and the controller to place the wires. This kind of dividing mounting mode of the motor and controller not only enables the whole motor to occupy a large space, but also the whole machine design should consider many factors. The wire routing between the motor and the controller has been already very complicated, and since the motor and the controller are connected through the wire, the performance loss and the cost are virtually increased, and the production efficiency is reduced. At the same time, many wires inside the whole machine enable the internal structure to be disorganized, which increases the difficulty of later maintenance work. In addition, the motor and the controller are connected by wires, which may easily lead to the risk of falling off.

SUMMARY

The disclosure provides a DC brushless motor and is used to solve a problem of the conventional DC brushless motor that the internal wiring of the motor is complicated because the motor and the controller are dividedly installed.

The disclosure provides the DC brushless motor, which includes a housing, a motor assembly, a control board and a dividing plate. Wherein, the motor assembly is arranged in the housing, and a connecting terminal is connected to the motor assembly. The control board is arranged in the housing and electrically connected with the connecting terminal. The dividing plate is arranged in the housing and is used to divide the motor assembly from the control board.

Further, the housing includes a housing body, a first cover and a second cover, the first cover and the second cover are respectively arranged at two ends of the housing body, the dividing plate is arranged in the housing body, the dividing plate divides a cavity of the housing body into a first cavity and a second cavity, the motor assembly is arranged in the first cavity, the control board is arranged in the second cavity, and the connecting terminal is configured to penetrate out of a through hole on the dividing plate to be electrically connected with the control board.

Further, the housing includes a housing body, a first cover and a second cover, the first cover and the second cover are respectively arranged at two ends of the housing body, the dividing plate is arranged at one end of the housing body and configured to block the housing body, the control board is mounted on the dividing plate, located outside the housing body and covered by the second cover, and the connecting terminal is configured to penetrate out of a through hole on the dividing plate to be electrically connected with the control board.

Further, the motor assembly includes a stator assembly and a rotor assembly, the rotor assembly is rotatably arranged inside the stator assembly, and the connecting terminal includes three first connecting terminals connected with the stator assembly and one second connecting terminal connected with the rotor assembly.

Further, the stator assembly includes a plastic-coated stator, three single-phase conductive assemblies, each of the single-phase conductive assemblies includes a single-phase winding and a bridge wire, the single-phase winding is wound on the plastic-coated stator, the bridge wire is arranged inside the plastic-coated stator and electrically connected with an outlet end of the corresponding single-phase winding, and the three first connecting terminals are respectively arranged on the bridge line of the three single-phase conductive assemblies, and are exposed to an outside of the plastic-coated stator.

Further, the stator assembly further includes an insulating bracket to insulate and isolate the first connecting terminal from the dividing plate, a first end of the first connecting terminal connected with the bridge wire is embedded inside the plastic-coated stator, and a second end of the first connecting terminal away from the bridge wire is configured to penetrate out of the plastic-coated stator and penetrate through the insulating bracket to be electrically connected with the control board.

Further, the plastic-coated stator includes a stator main body, and a first insulator and a second insulator respectively arranged on two end faces of the stator main body, and the first insulator and the second insulator are in an integrally formed structure.

Further, the end of the first connecting terminal away from the bridge wire is welded on the control board.

Further, the bridge wire includes a first arc body, a second arc body and a transition body, the first arc body is connected with the second arc body through the transition body, and a radius of the first arc body is different from a radius of the second arc body.

Further, the dividing plate is provided with a plurality of concave areas, the concave area is concave from the first cavity to the second cavity, and protrudes towards the second cavity to form a first boss, the plurality of the concave areas is evenly distributed at an edge of the dividing plate along a circumferential direction, an inner wall of the housing in the first cavity is provided with concave grooves of which a number is corresponding to a number of the concave areas, and the concave grooves communicate with the corresponding concave areas.

Further, the first connecting terminal is provided in the concave area, and the concave area located at the first connecting terminal is provided with a through hole for the first connecting terminal to pass through.

Further, the bridge wire is further provided with a third connecting terminal, a first end of the third connecting terminal connected with the bridge wire is located inside the plastic-coated stator, and a second end of the third connecting terminal away from the bridge wire is exposed on an outside of the plastic-coated stator.

Further, an outlet end of the single-phase winding is electrically connected with a nearest one of the first connecting terminal and the third connecting terminal.

Further, an outlet end of the single-phase winding is spot welded to a nearest one of the first connecting terminal and the third connecting terminal.

Further, the bridge wire, the first connecting terminal and the third connecting terminal are in an integrally formed structure.

Further, the first connecting terminal and the third connecting terminal are both provided with a hook, and a height of the first connecting terminal is greater than a height of the third connecting terminal.

Further, the rotor assembly includes a rotor and a magnetic sensor arranged on the rotor, and an end of the second connecting terminal facing the first cavity body is electrically connected with the magnetic sensor.

Further, an end of the second connecting terminal away from the magnetic sensor is welded on the control board.

Further, the dividing plate and the housing are in an integrally formed structure.

In summary, the disclosure has following beneficial effects: the motor assembly and the control board are arranged inside the housing of the motor, and the controller is infinitely close to a motor body, eliminating the need for connecting wires therebetween; when assembling with the whole machine, there is no need to consider a problem of a controller space and wire routing, so that problems involved in a design process of the whole machine are relatively simplified, and a design is more targeted; at the same time, due to a reduction of the connecting wire between the motor assembly and the controller, a production process of the whole machine is more convenient.

DETAILED DESCRIPTION

Figure 1:
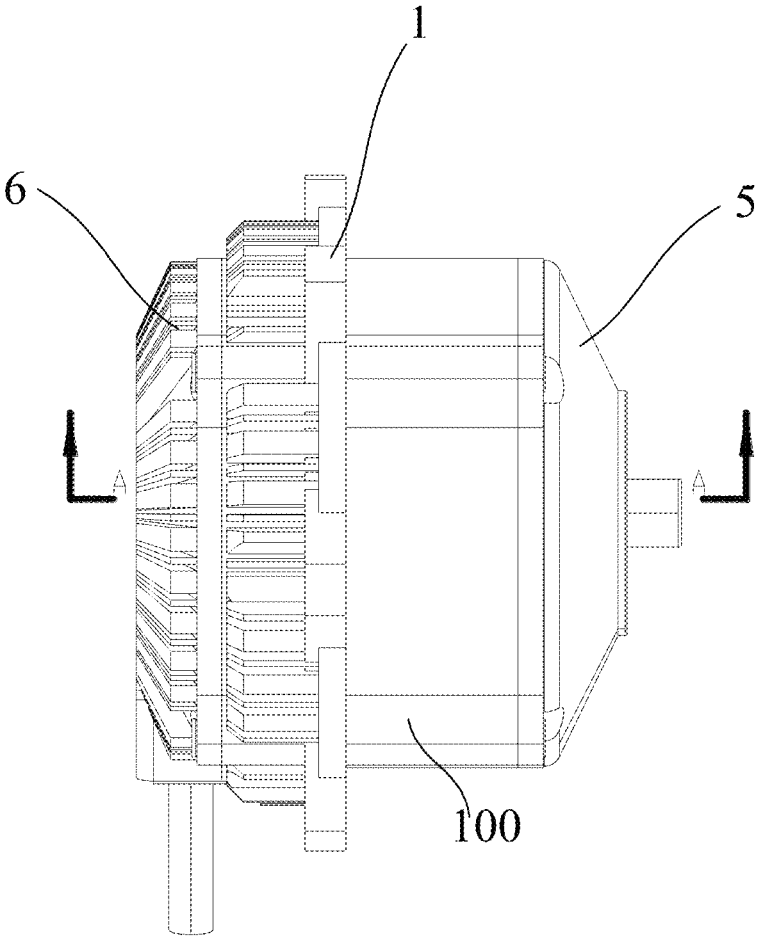
FIG. 1 is a schematic structural view of a DC brushless motor according to an embodiment of the disclosure.

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

Please refer to FIG. 1 through FIG. 17. The disclosure provides a DC brushless motor and is used to solve a problem of the common DC brushless motor that the internal wiring of the motor is complicated as the motor and the controller are dividedly installed. The DC brushless motor includes a housing 1, a dividing plate 2, a motor assembly 3, and a control board 4. The motor assembly 3 is mounted in the housing 1, and a connecting terminal is coupled to the motor assembly 3. The control board 4 is arranged inside the housing and electrically connected with the connecting terminal. The dividing plate 2 is arranged in the housing 1 and is used to divide the motor assembly 3 from the control board 4.

The motor assembly 3 and the control board 4 are located inside the housing of the motor. The control board 4 shares the housing with the motor assembly 3, and the control board 4 dissipates heat through the housing 1. A division mounting mode of the motor assembly 3 and control board 4 is abandoned, and save a space. Simultaneously, through the connecting terminal directly connected with control board 4, a complicated wire connection between the motor assembly 3 and the control board 4 is omitted, so that a circuit layout inside the housing is concise, which is convenient for a later maintenance. Please refer to FIG. 1 and FIG. 2. The housing includes a housing body 100, a first cover 5 and a second cover 6, the first cover 5 and the second cover 6 are respectively arranged at two ends of the housing body 100, the dividing plate 2 is arranged in the housing body 100, the dividing plate 2 divides a cavity of the housing body 100 into a first cavity 101 and a second cavity 102, the motor assembly 3 is arranged in the first cavity 101, the control board 4 is fixed on the dividing plate 2 through a bolt and arranged in the second cavity 102, and the connecting terminal is configured to penetrate out of a through hole on the dividing plate 2 to be electrically connected with the control board 4. The first cover 5 is used to cover the first cavity 101, and the second cover 6 is used to cover the second cavity 102. An outer wall of the housing 1 at the second cavity 102 is provided with a heat dissipating piece, and an outer wall of the second cover 6 is also provided with a heat dissipating piece. The control board 4 may dissipate heat through the housing 1.

Figure 17:
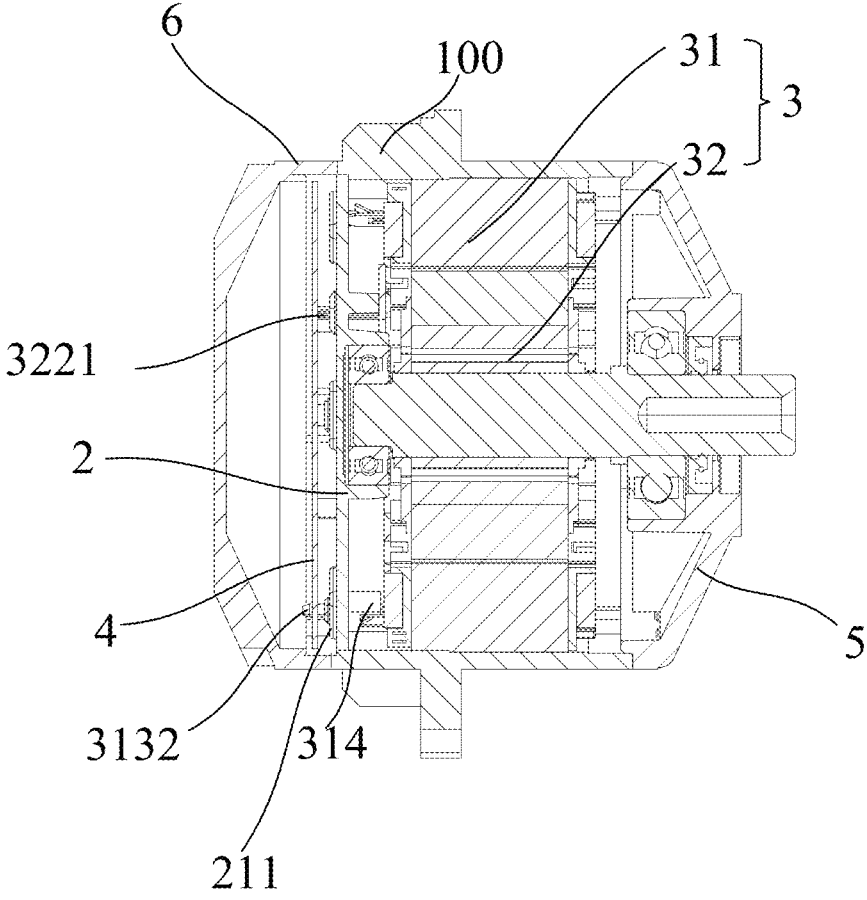
FIG. 17 is a cross-sectional view of a dividing plate located at an end part of a housing main body according to an embodiment of the disclosure.

Please refer to FIG. 1 and FIG. 17. The dividing plate 2 is arranged at one end of the housing body 100, and the housing body 100 is blocked and located inside the second cover 6. The control board 4 is mounted on the dividing plate 2, located outside the housing body 100 and covered by the second cover 6, and the connecting terminal is electrically connected with the control board 4 from a through hole in the dividing plate 2.

Please refer to FIG. 2 through FIG. 13. The motor assembly 3 includes a stator assembly 31 and a rotor assembly 32, the stator assembly 31 is fixedly mounted in the first cavity 101, and the rotor assembly 32 is rotatably arranged inside stator assembly 31. The rotor assembly 32 is respectively mounted on the first cover 5 and the dividing plate 2 through a bearing, so that the rotor assembly 32 is rotatably mounted in the stator assembly 31. The connecting terminal includes three first connecting terminals 3132 and one second connecting terminal 3221, ends of three first connecting terminals 3132 towards the first cavity 101 are respectively connected with electric input ends of varnished wires of U, V, W three-phase windings, and ends of the three first connecting terminals 3132 towards the second cavity 102 pass through the dividing plate 2 and are electrically connected with corresponding terminals on the control board 4. An end of the second connecting terminal 3221 towards the first cavity 101 is electrically connected with a Hall sensor of a rotor winding.

Figure 2:
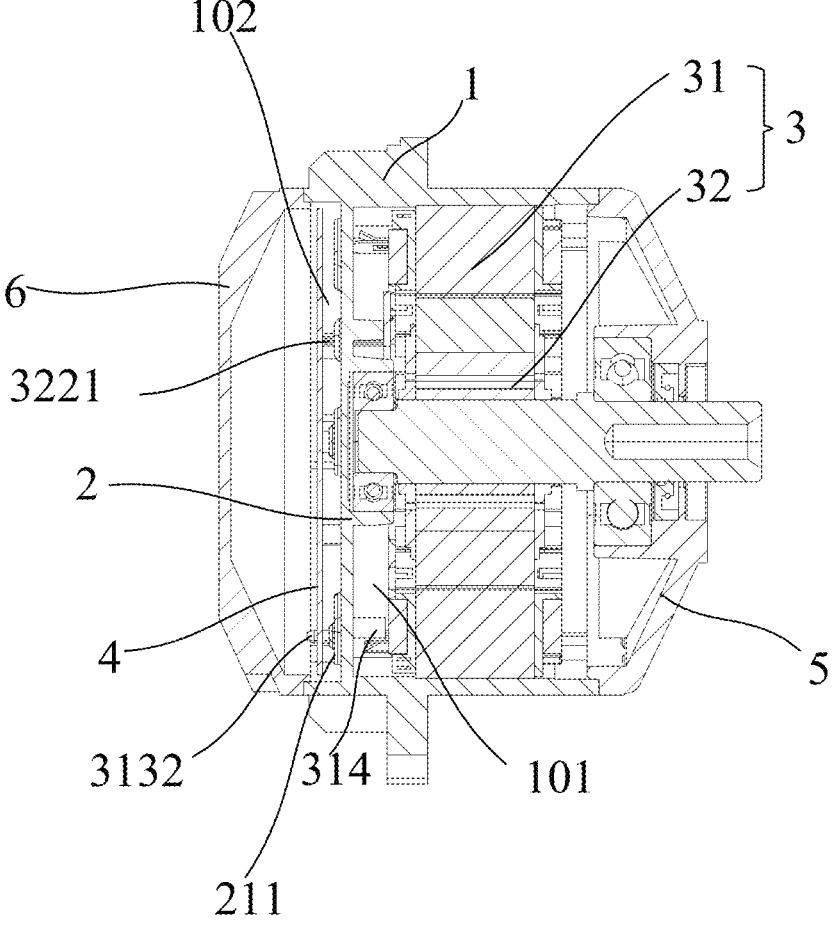
FIG. 2 is a cross-sectional view of A-A in FIG. 1.
Figure 3:
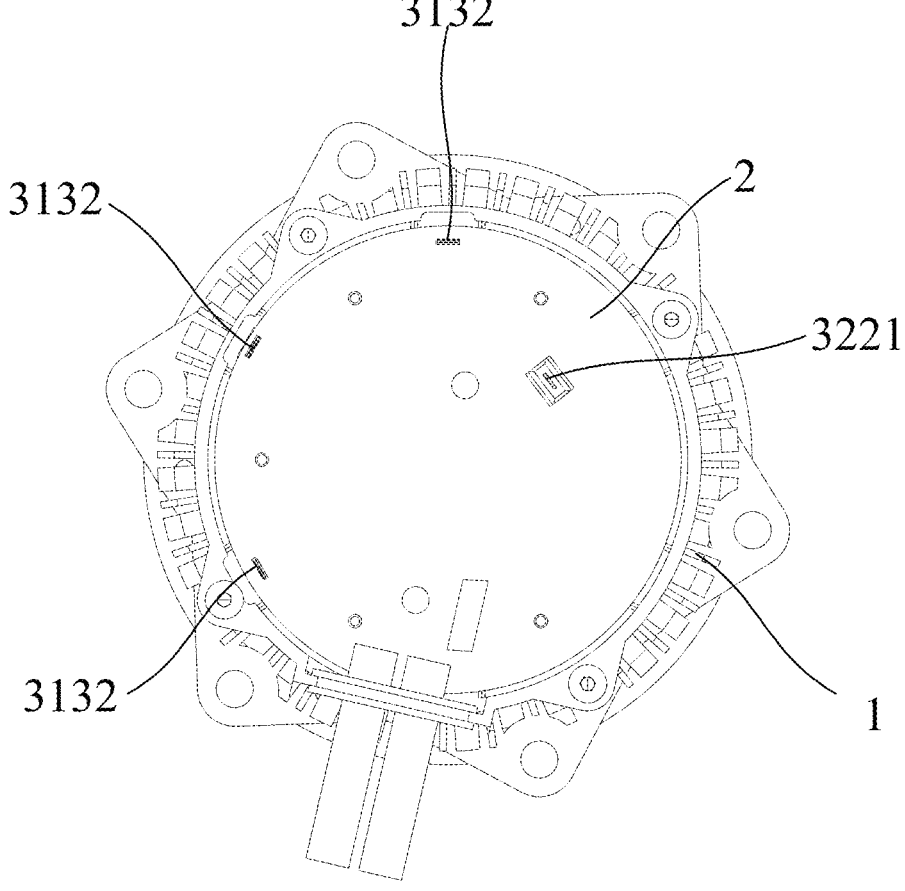
FIG. 3 is a schematic structural view of the DC brushless motor after removing a second cover and exposing a control board according to an embodiment of the disclosure.
Figure 4:
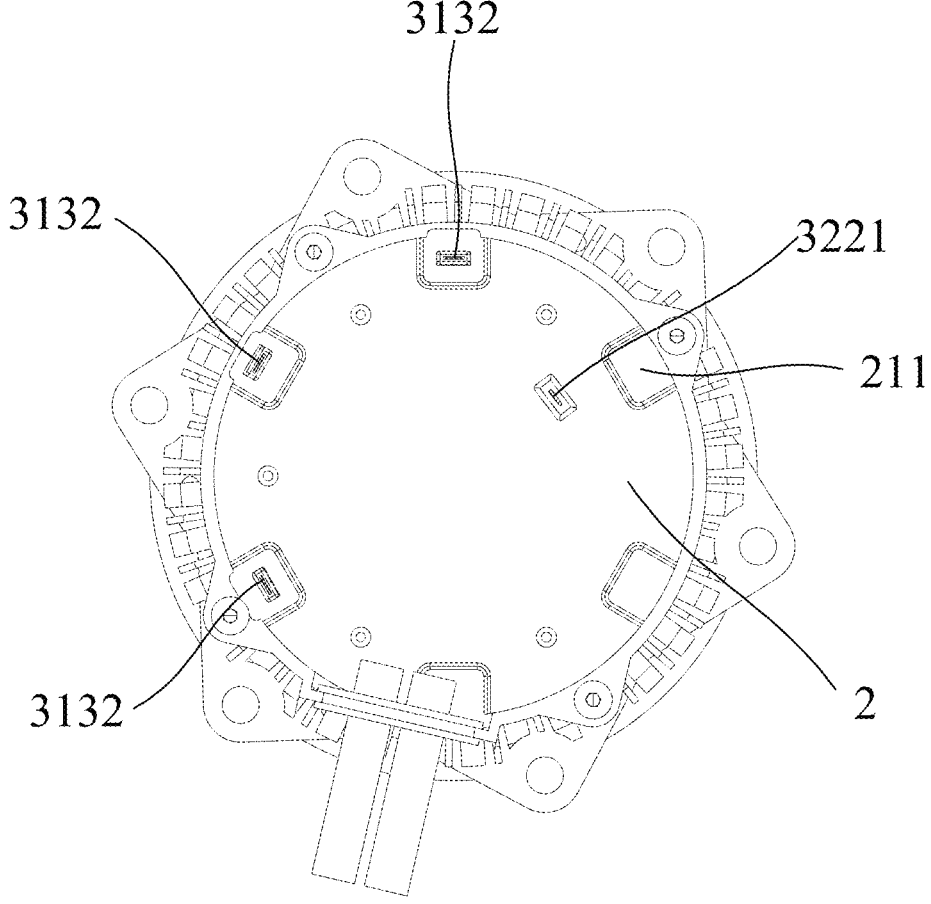
FIG. 4 is a schematic structural view of FIG. 3 after removing the control board.
Figure 5:
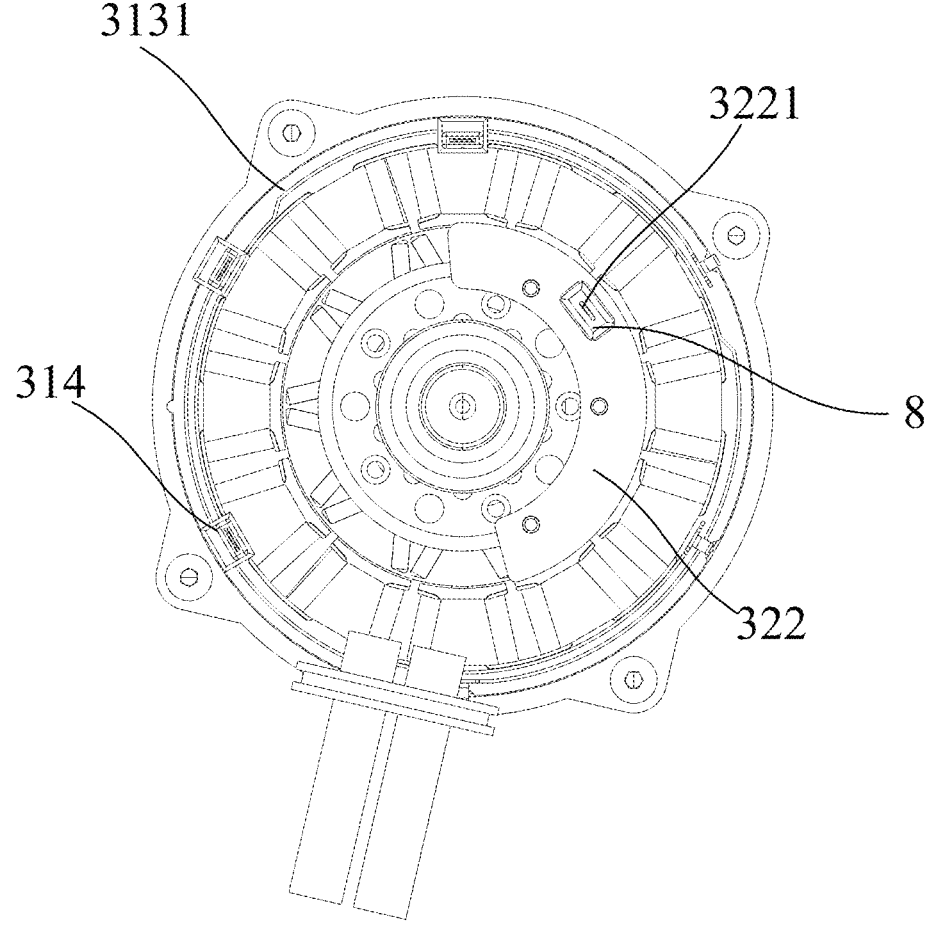
FIG. 5 is a schematic structural view of FIG. 4 after removing a housing, a dividing plate and a first insulator.
Figure 11:
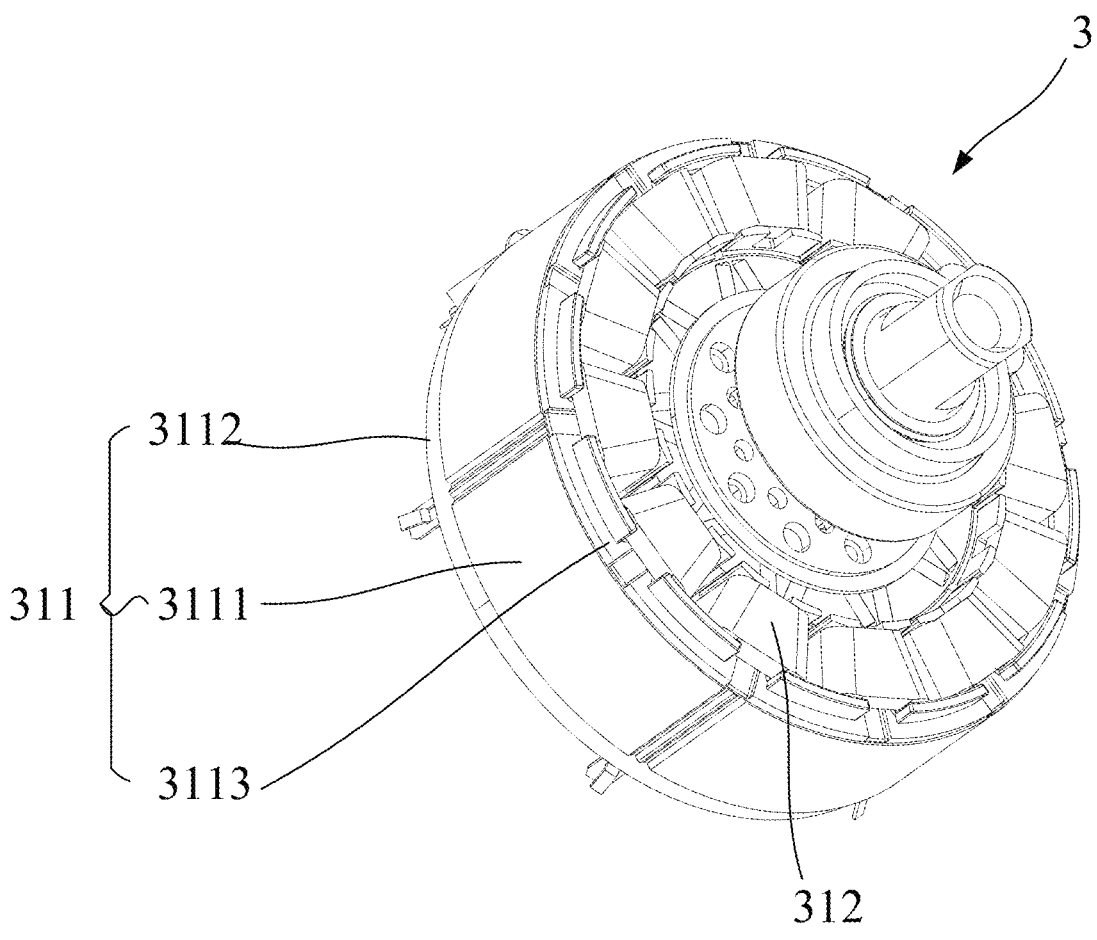
FIG. 11 is a perspective schematic structural view of the motor assembly according to an embodiment of the disclosure.
Figure 12:
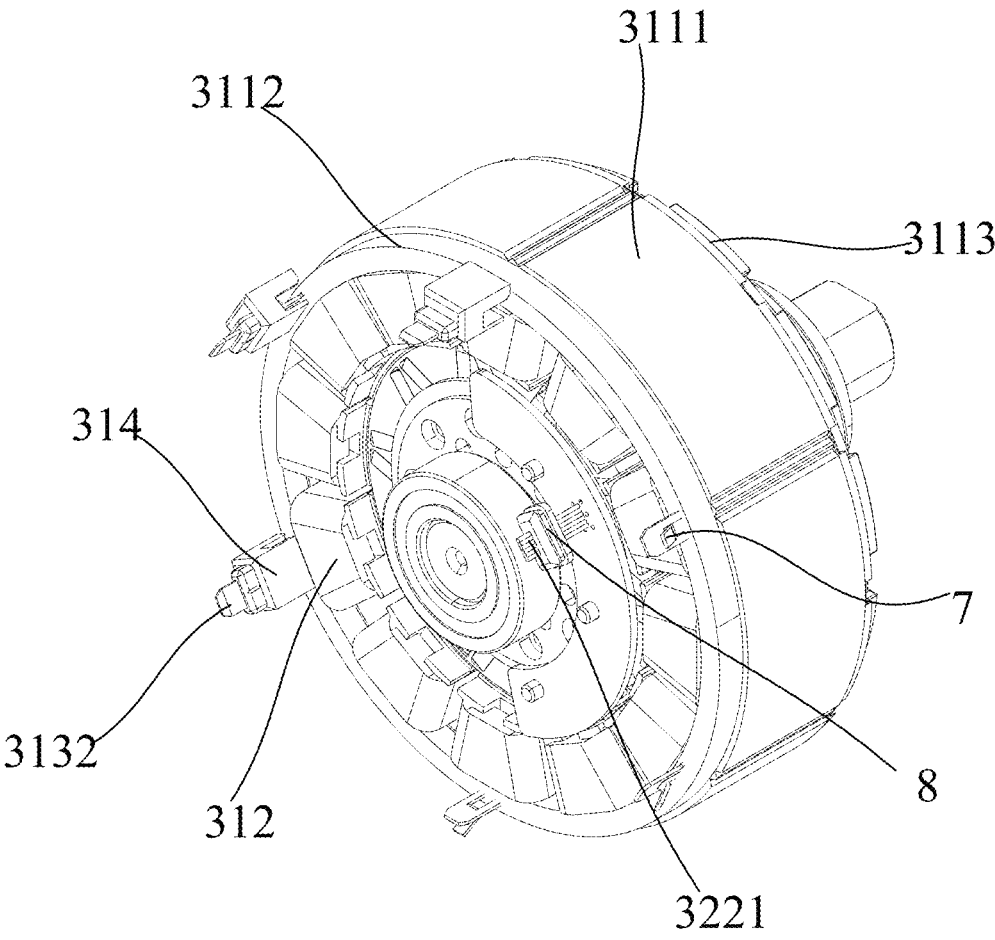
FIG. 12 is a perspective schematic structural view of the motor assembly from another angle according to an embodiment of the disclosure.

Please refer to FIG. 2, FIG. 5 and FIG. 11. The stator assembly 31 includes a plastic-coated stator 311, three single-phase conductive assemblies, which means three single-phase assemblies of U, V, W, each of the single-phase conductive assemblies includes a single-phase winding 312 and a bridge wire 3131, the single-phase winding 312 is wound on the plastic-coated stator 311, the bridge wire 3131 is arranged inside the plastic-coated stator 311 and electrically connected with an outlet end of the corresponding single-phase winding 312, and the three first connecting terminals 3132 are respectively arranged on the bridge lines 3131 of the three single-phase conductive assemblies, exposed from the plastic-coated stator and electrically connected with the control board 4. The bridge wire 3131 is used to conduct electricity between the control board 4 and the varnished wire, thereby eliminating a need for conducting wires and electrical conduction between the varnished wire and the control board.

Please refer to FIG. 5 through FIG. 12. The stator assembly 31 further includes an insulating bracket 314 for insulating and isolating the first connecting terminal 3132 from the housing 1 and the dividing plate 2. The insulating bracket is mounted on the first connecting terminal 3132 and isolating the first connecting terminal from the dividing plate 2. An end of the first connecting terminal 3132 connected to the bridge wire 3131 is clamped inside the plastic-coated stator 311. An end of the first connecting terminal 3132 away from the bridge wire 3131 penetrates out of the insulating bracket 314, extends into the second cavity 102 and is electrically connected with the control board 4. An electrical connection mode may be unlimited, in some embodiments, one end of the first connecting terminal 3132 away from the bridge wire 3131 is spot-welded on the control board 4 through soldering. An electrical connection mode of the first connecting terminal 3132 and the control board 4 adopts a welding process, the process is simple, and there is no extra guiding wire inside the motor. The first connecting terminal 3132 is sleeved with the insulating bracket 314, and the insulating bracket 314 not only plays a role of insulation, but also ensures that there is a sufficient creepage distance when the stator core and the varnished wire are matched to meet safety regulations.

Figure 16:
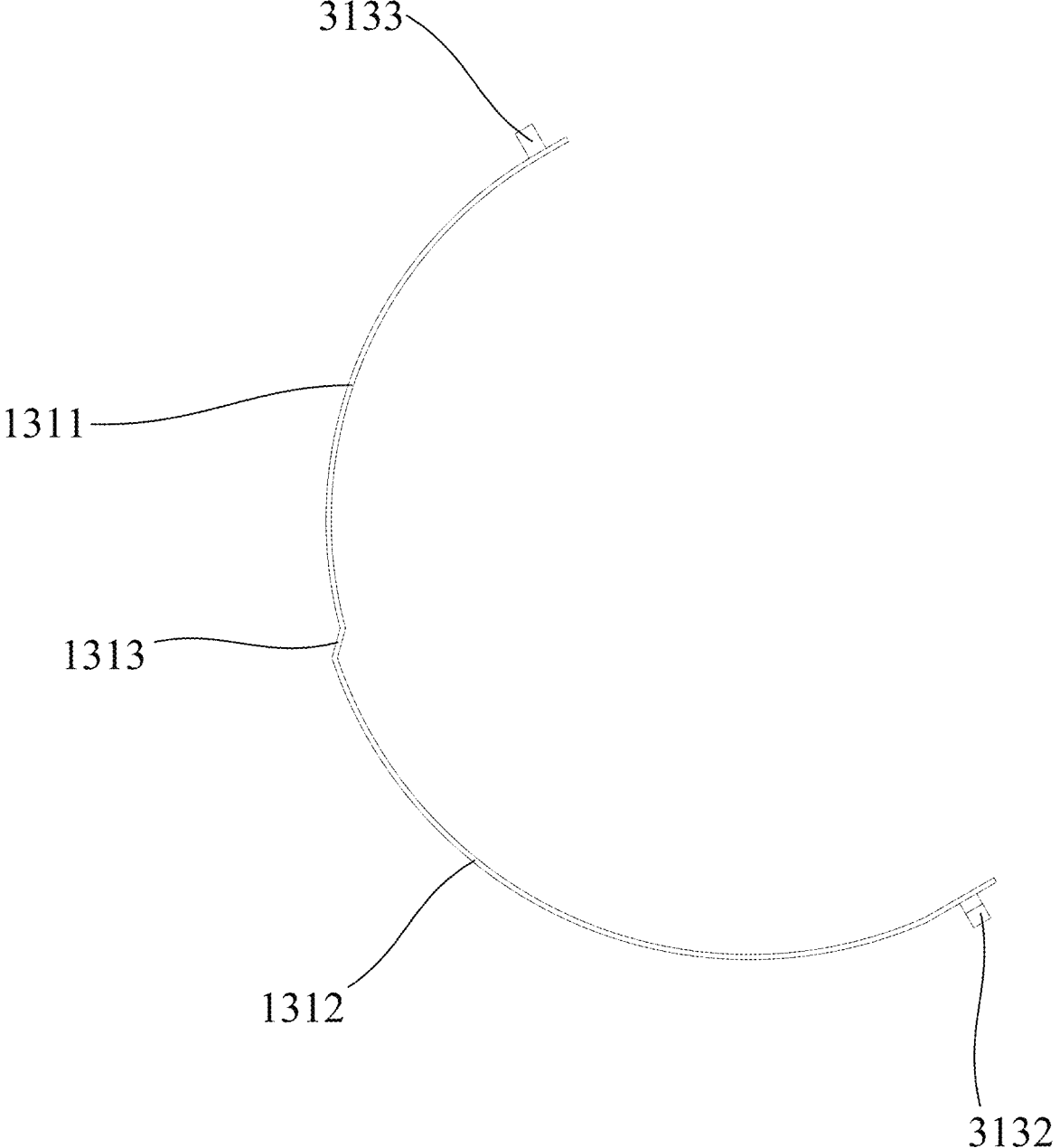
FIG. 16 is a schematic structural view of the bridge wire according to an embodiment of the disclosure.

Please refer to FIG. 16. The bridge wire 3131 includes a first arc body 1311, a second arc body 1312 and a transition body 1313, the first arc body 1311 is connected with the second arc body 1312 through the transition body 1313, and the first arc body 1311 is concentric with the second arc body 1312 but a radius of the first arc body 1311 is different from a radius of the second arc body 1312. The first arc body 1311, the second arc body 1312 and the transition body 1313 are in an integrally formed structure. This design is conducive to saving a space of a layout of the three bridge wires in the plastic-coated stator 311, and simultaneously ensures that there is a sufficient safety distance between the adjacent two bridge wires 3131.

Please refer to FIG. 5 through FIG. 12. The plastic-coated stator 311 includes a stator body 3111, and a first insulator 3112 and a second insulator 3113 respectively arranged on two ends of the stator body 3111. The stator body 3111 is provided with the stator core (not shown), and the first insulator 3112 and the second insulator 3113 are in an integrally formed structure. The bridge wire 3131 is clamped in the first insulator 3112, the three bridge wires 3131 have no contact with each other, and a gap between two adjacent bridge wires 3131 is filled by the first insulator 3112.

Figure 18:
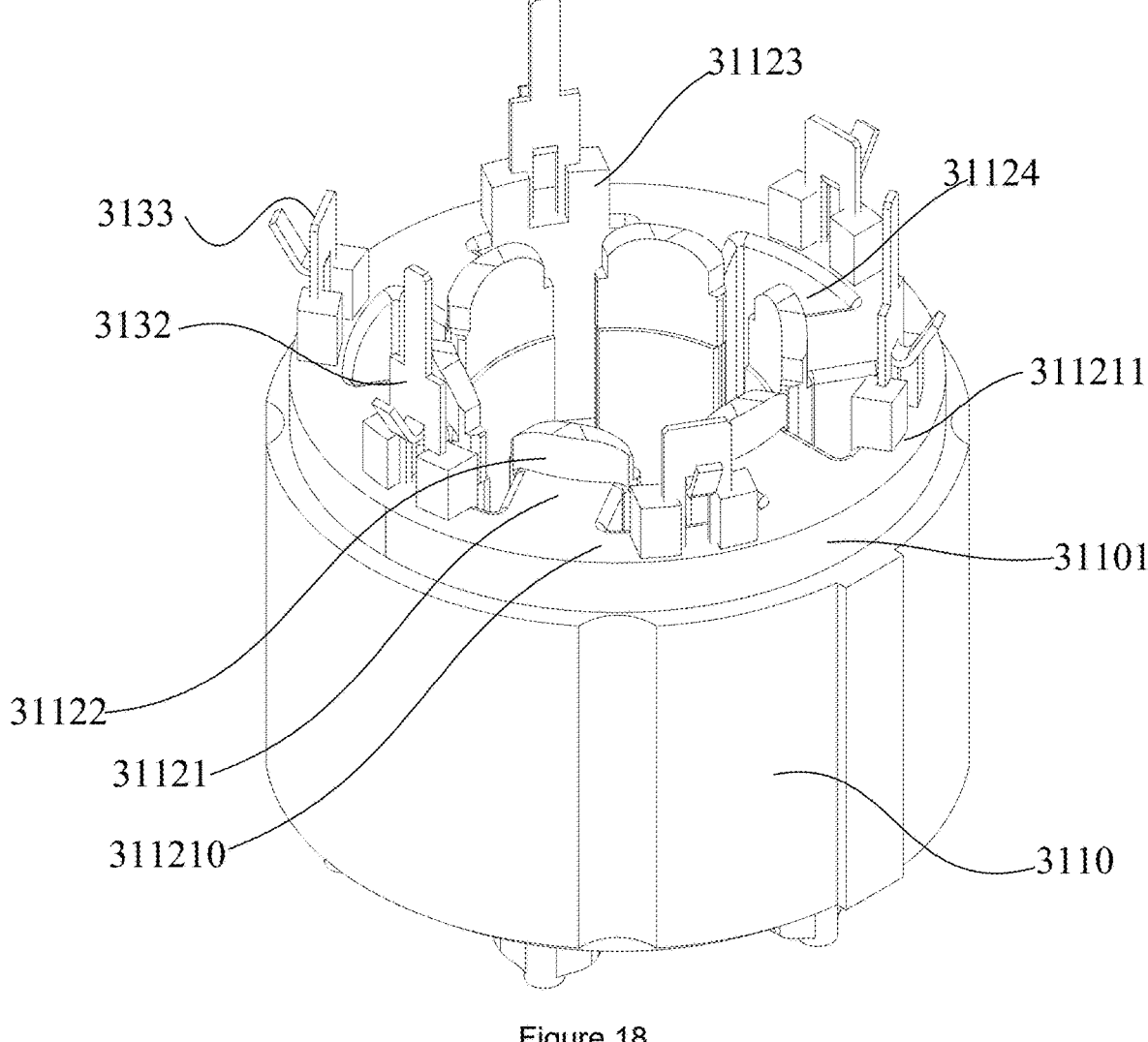
FIG. 18 is a perspective schematic structural view of a stator assembly according to an embodiment of the disclosure.
Figure 19:
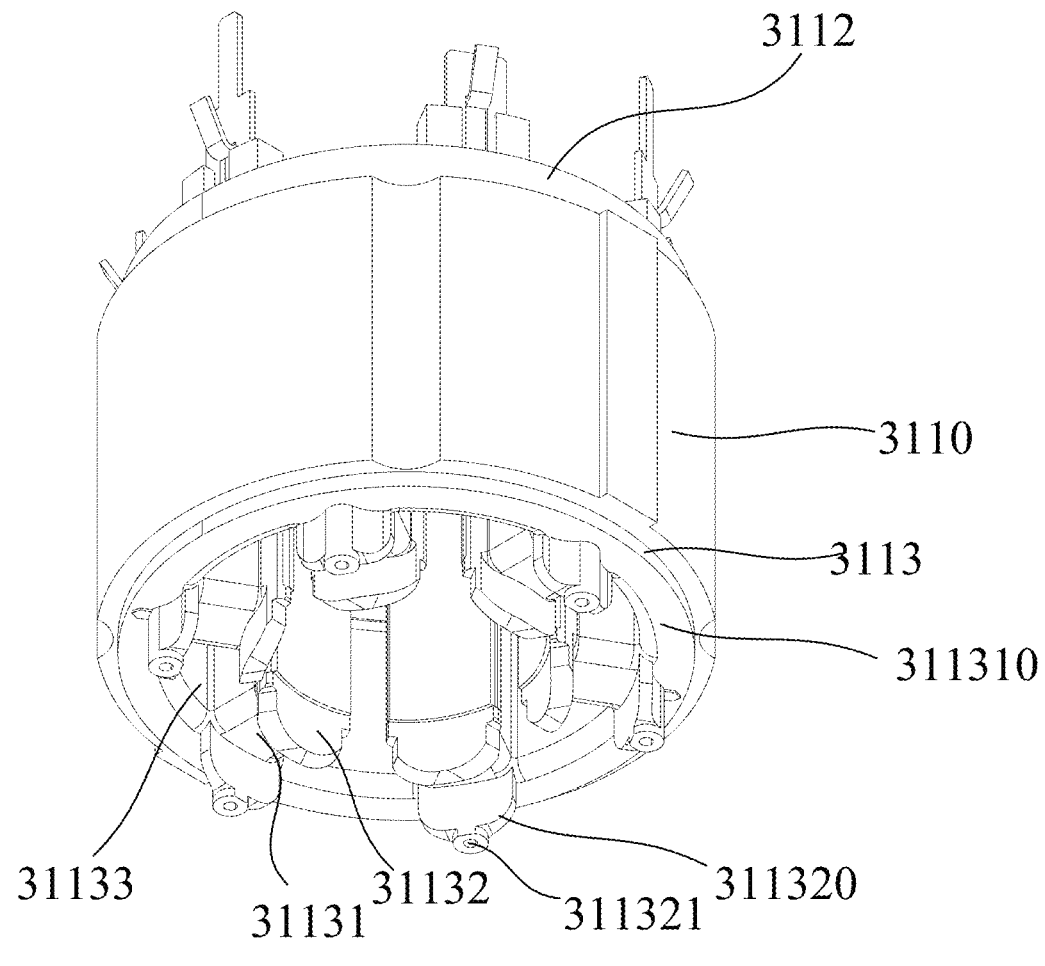
FIG. 19 is a perspective schematic structural view of the stator assembly from another angle according to an embodiment of the disclosure.
Figure 20:
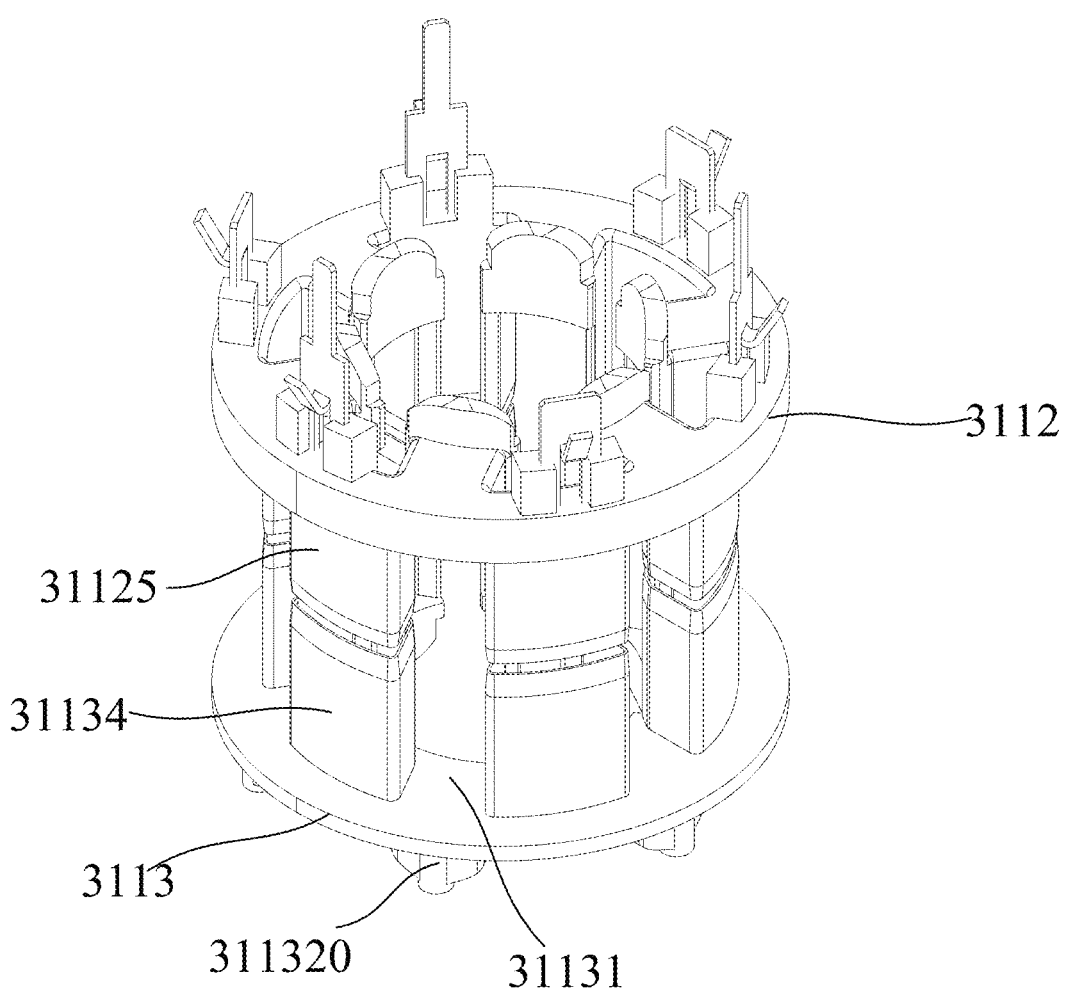
FIG. 20 is a schematic structural view of FIG. 18 after removing a stator core.
Figure 21:
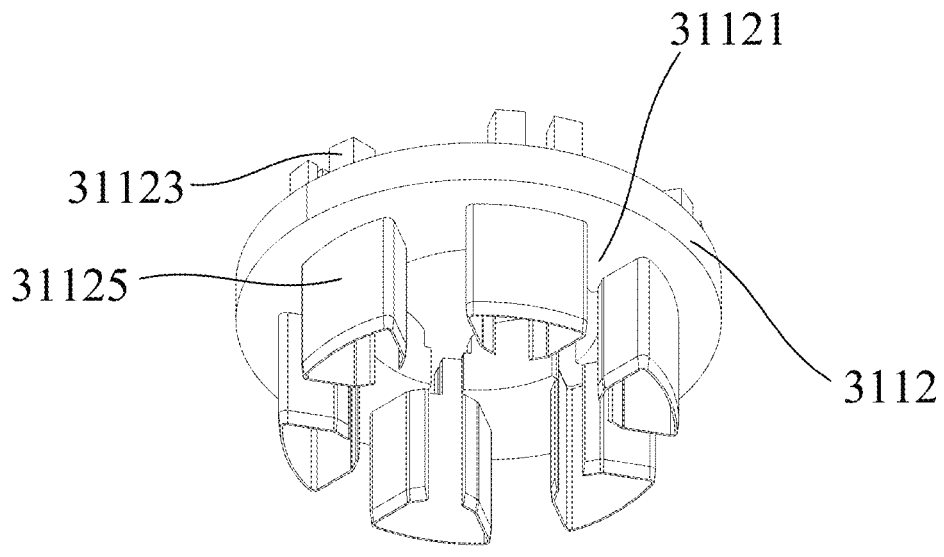
FIG. 21 is a schematic structural view of a first insulator according to an embodiment of the disclosure.
Figure 22:
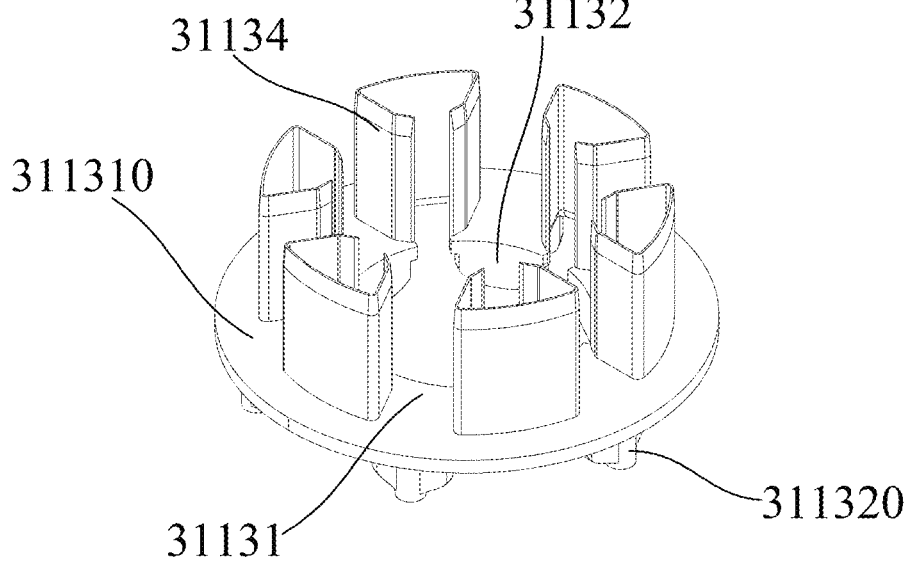
FIG. 22 is a schematic structural view of a second insulator according to an embodiment of the disclosure.
Figure 29:
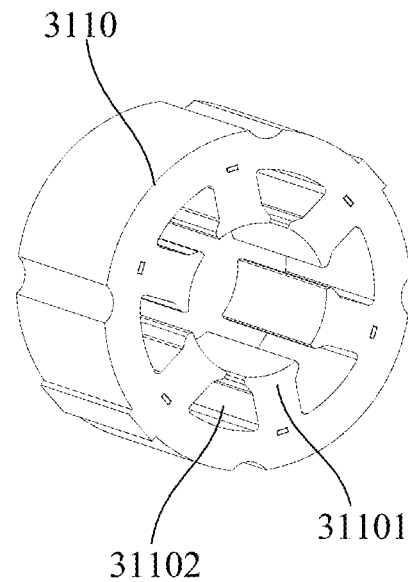
FIG. 29 is a schematic structural view of the stator core in the rotor assembly according to an embodiment of the disclosure.

Please refer to FIG. 18, FIG. 19 and FIG. 29. The stator assembly 31 includes the stator core 3110, the first insulator 3112, a bridge wire group (embedded in the first insulator 3112 is not shown), the connecting terminal group, and the second insulator 3113. Wherein the stator core 3110 is provided with a plurality of winding teeth 31101, a separating groove 31102 is formed between the adjacent winding teeth 31101, the first insulator 3112 is arranged on a first end face of the stator core 3110, and the first insulator 3112 is plastic-coated at one end of the stator core 3110, and partially covers the first end face of the stator core 3110. The bridge wire group is buried in the first insulator 3112, a number of bridge wires in the bridge wire group is determined according to a number of phases of the motor, and in an embodiment, the motor is a three-phase motor, and the bridge wire group includes three bridge wires 3131. The number of the connecting terminal group corresponds to a number of bridge lines, for example, in an embodiment, each bridge line is provided with one connecting terminal group, each connecting terminal group includes at least two connecting terminals, and a number of connecting terminals may be determined according to a number of motor poles. Please refer to FIG. 23. In an embodiment, the number of motor poles is 6 poles, the bridge wire group includes three bridge wires 3131, each bridge wire 3131 is connected with two connecting terminals, the connecting terminals are electrically connected with the bridge wire 3131, the connecting terminals are partially buried and clamped inside of the first insulator 3112, and part of the connecting terminals is exposed outside the first insulator 3112. The second insulator 3113 is located on a second end face of the stator core 3110 and partially covers the second end face of the stator core 3110.

The plastic-coated stator comprise the first insulator 3112, the second insulator 3113 and the stator core 3110, and the plastic-coated stator uses a plastic injection molding process to form a compact solid with the stator core 3110 and a skeleton (the skeleton is composed of the first insulator 3112 and the second insulator 3113). So that the skeleton and the stator core are integrated, and a winding and the stator core 3110 are separated by the skeleton to realize a strengthening insulation. A use of skeleton injection molding process helps to saturate the skeleton and enhance a supporting strength of the skeleton, so as to have a sufficient thickness to ensure the creepage distance, which enhances an adhesion force of the skeleton on the stator core 3110. Therefore, a skeleton strength of the plastic-coated stator is stronger than that of an intercalated skeleton. Since the plastic-coated stator does not have a gap between the intercalated skeletons, a risk of creepage is reduced. At the same time, a wall thickness of a plastic-coated material of the plastic-coated stator is smaller, which can increase an area of a stator winding groove.

In one embodiment, the stator core, an injection molding material, and the bridge wire are tightly fixed together through a mold and a high-pressure injection machine. The bridge wire 3131 is located in the first insulator 3112, which not only satisfies performance requirements of a wire crossing, but also enables the end face to be clean. The bridge wire 3131 is deeply buried in the injection molding material, which is not only fastened, but also may ensure an insulation distance of an overpower, and meets requirements of safety standards.

Please refer to FIG. 18 through FIG. 21. In an embodiment, the first insulator 3112 includes a first ring body 311210, an inner side of the first ring body 311210 is uniformly provided with a plurality of first teeth 31121, the first tooth 31121 is provided with a first flange 31122, and the first flange 31122 protrudes to a surface of the first ring body 311210.

Please refer to FIG. 18. In the first embodiment, a plurality of brackets 31123 are uniformly arranged on the first end face 311211 of the first ring body, and the connecting terminals pass through the bracket 31123 and extend to an outside of the bracket 31123. A number of brackets 31123 correspond to a number of connecting terminals, the bracket 31123 and the first ring body 311210 are in an integrally formed structure, and the bracket 31123 can effectively increase the creepage distance of the connecting terminals, so as to comply with safety regulations and increase a safety of the motor.

Please refer to FIG. 19 through FIG. 22. In the first embodiment, the first insulator 3112 is provided with a first groove insulator 31125 covering a wall at a first end of the separating groove 31102, a first groove 31124 is formed between the adjacent two first teeth 31121, the first groove insulator 31125 is penetrated with the first groove 31124, and the first groove insulator 31125 and the first groove 31124 are in an integrally formed structure. The second insulator 3113 is provided with a second groove insulator 31134 covered on a wall at a second end of the separating groove 31102, a second groove 31133 is formed between two adjacent second teeth 31131, the second groove insulator 31134 is penetrated with the second groove 31133, the second groove insulator 31134 and the second groove 31133 are in an integrally formed structure, and the first groove 31125 and the second groove insulator 31134 extend toward each other. The first groove insulator 31125 is matched with the second groove insulator 31134, and most of the separating groove 31102 between two adjacent winding teeth 31101 on the stator core 3110 is covered, which leaves only a slight gap between the first groove 31125 and the second groove insulator 31134. This can effectively increase an insulation between the winding and the stator core 3110.

Please refer to FIG. 18 and FIG. 19. In an embodiment, side walls of the first groove 31124 on both sides of the first tooth 31121 are transitioned with the first ring body 311210 through a first rounded corner. Side walls of the second groove insulator 31134 on both sides of the second tooth 31131 are transitioned with the second ring body 311310 through a second rounded corner. Radii of the first rounded corner and second rounded corner are greater than or equal to 1.5 times a diameter of the varnished wire in a varnished wire winding. This setting may reduce a damage of the first insulator 3112 and the second insulator 3113 to the varnished wire in the winding.

In an embodiment, the first ring body 311210, the first tooth 31121, the bracket 31123, the first flange 31122, and the first groove body 31125 are in an integrally formed structure.

Please refer to FIG. 19 through FIG. 22. In an embodiment, the second insulator 3113 includes a second ring body 311310, an inner side of the second ring body 311310 is uniformly provided with a plurality of second teeth 31131, the second tooth 31131 is provided with a second flange 31132, a tooth root of the second tooth 31131 is provided with a third flange 311320, and both the second flange 31132 and the third flange 311320 protrudes to a surface of the second ring body 311310.

A number of the first teeth 311210, a number of the second teeth 31121 correspond to a number of winding teeth of the stator core 3110, and the first tooth 31120 and the second tooth 31121 are mounted in one-to-one correspondence with the winding teeth of the stator core 3110, which forms teeth of the plastic-coated stator. These three teeth are used to be matched and wrap the varnished wire winding.

In an embodiment, side surfaces that are of the first flange 31122, the second flange 31132 and the third flange 311320 and that are in contact with the varnished wire winding are cylindrical surfaces, and the cylindrical surfaces are coaxially arranged with the stator core 3110. On the one hand, an arrangement of the first flange 31122, the second flange 31132 and the third flange 311320 may ensure that the varnished wire in the winding is arranged in layers within a set stacking height, and on the other hand, the cylindrical surfaces coaxially arranged with the stator core 3110 may reduce a friction damage between the winding and each flange.

Please refer to FIG. 19. In an embodiment, the third flange 311320 is provided with a fixed hole 311321, and an end of the third flange 311320 towards a center of the stator core is a third curved surface. The third curved surface may be a cylindrical surface and coaxially arranged with the stator core, and this arrangement facilitates a rotation of the rotor.

In an embodiment, the second ring body 311310, the second tooth 31131 the second flange 31132, the second groove insulator 31134 and the third flange 311320 are in an integrally formed structure.

Figure 23:
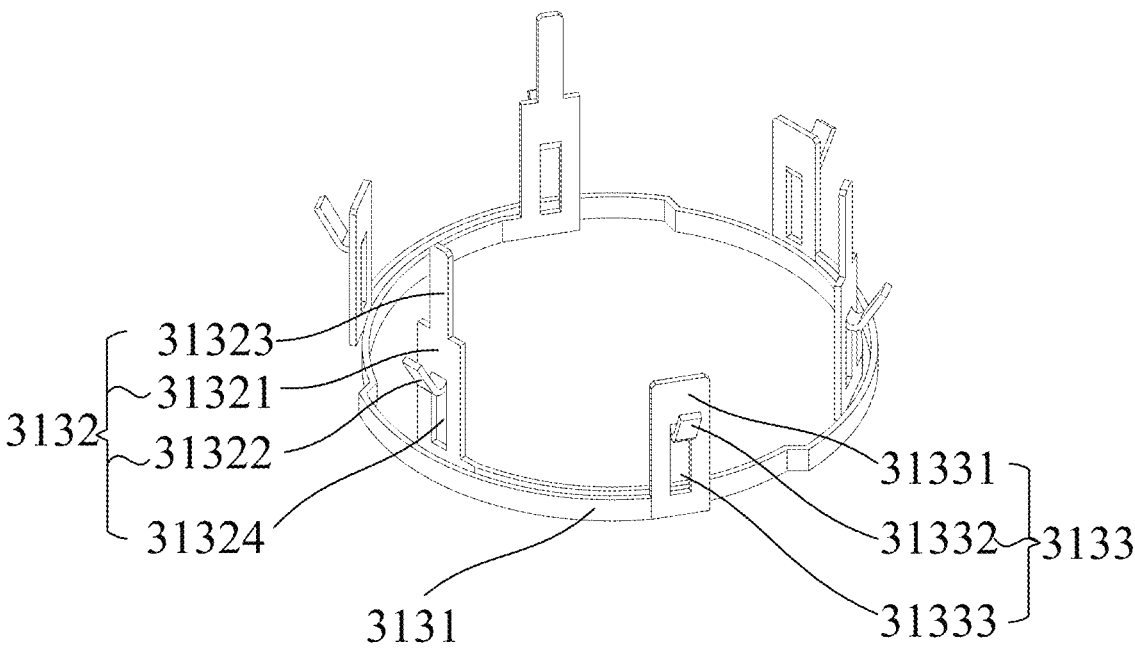
FIG. 23 is a schematic structural view of an arrangement of the bridge wires in a bridge wire group according to an embodiment of the disclosure.
Figure 24:
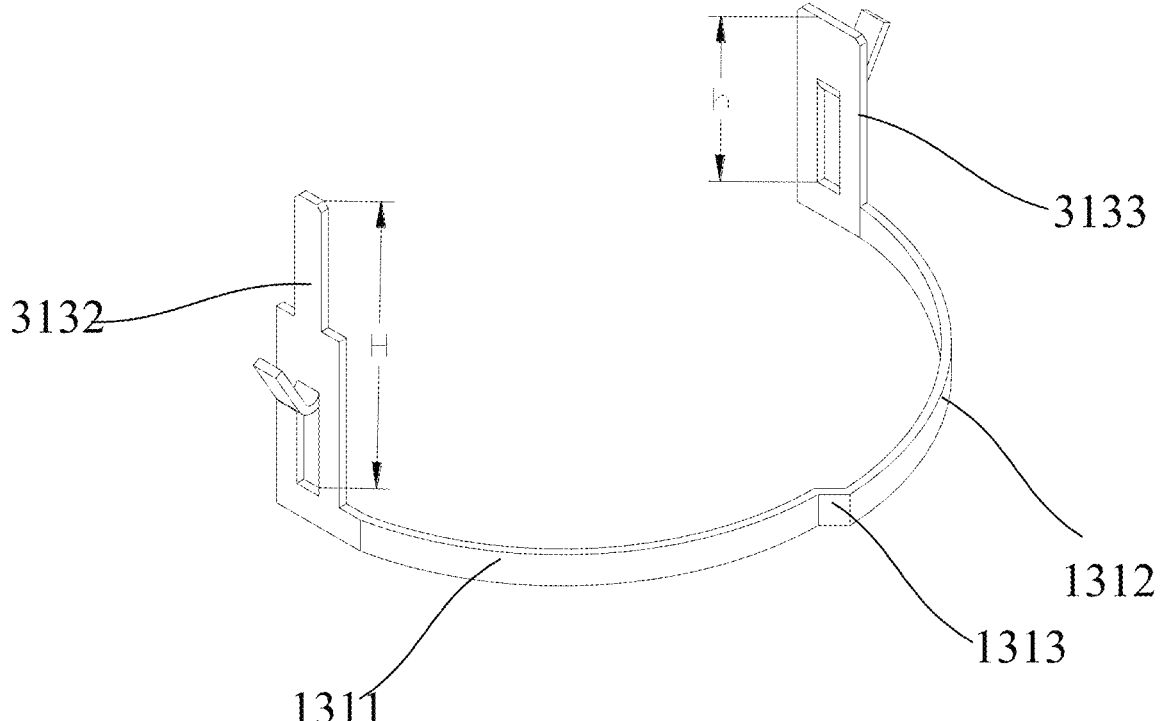
FIG. 24 is a schematic structural view of the bridge wire according to an embodiment of the disclosure.

Please refer to FIG. 23 through FIG. 24. In an embodiment, bottom surfaces of the bridge wires 3131 in the bridge wire group are located on a same horizontal plane. A gap between adjacent bridge lines 3131 is greater than or equal to 1 mm, and this gap is filled by the first insulator, so that an insulation between the bridge lines is guaranteed. The bridge wire 3131 may be a copper strip piece. The first arc body 1311, the second arc body 1312 and the transition body 1313 may be in an integrally formed structure. Through embedding the copper strip piece of the bridge wire in the first insulator 3112, a phenomenon of armature wire accumulation is solved, a surface of the stator assembly is simple, and a production process is simple. And the winding and the copper strip piece of the bridge wire can be spot welded, which is with a high degree of mechanization and prevents errors.

Please refer to FIG. 24. In an embodiment, each connecting terminal group includes a first connecting terminal 3132 and a third connecting terminal 3133. A length H of the first connecting terminal 3132 along an axial direction of the stator core is greater than a length h of the third connecting terminal 3133 along an axial direction of the stator core.

Please refer to FIG. 23. In an embodiment, the first connecting terminal 3132 includes a connecting part and a wiring part, wherein, the connecting part is a first connecting part 31321, the wiring part is the first wiring part 31322, the first connecting part 31321 is fixedly connected with the bridge wire 3131, an end of the first connecting part 31321 away from the bridge wire is provided with a plugging wire pin 31323, and the first connecting part 31321 and the first wiring part 31322 are in an integrated structure. After the first wiring part 31322 is bent out from the first connecting part 31321, a first through hole 31324 is formed in the first connecting part 31321, and the first wiring part 31322 is bent and stretched out towards a side away from the center of the stator core 3110. The first connecting part 31321, the first wiring part 31322 and the plugging wire pin 31323 may be in an integrally formed structure.

Please refer to FIG. 23. In an embodiment, the third connecting terminal 3133 includes a connecting part and a wiring part, wherein, the connecting part is a second connecting part 31331, the wiring part is the second wiring part 31332, the second connecting part 31331 is fixedly connected with the bridge wire 3131, and the second connecting part 31331 and the second wiring part 31332 are in an integrated structure. After the second wiring part 31332 is bent out from the second connecting part 31331, a second through hole 31333 is formed in the second connecting part 31331, and the second wiring part 31332 is bent and stretched out towards a side away from the center of the stator core 3110. The second connecting part 31331, the second wiring part 31322 may be in an integrally formed structure.

Figure 25:
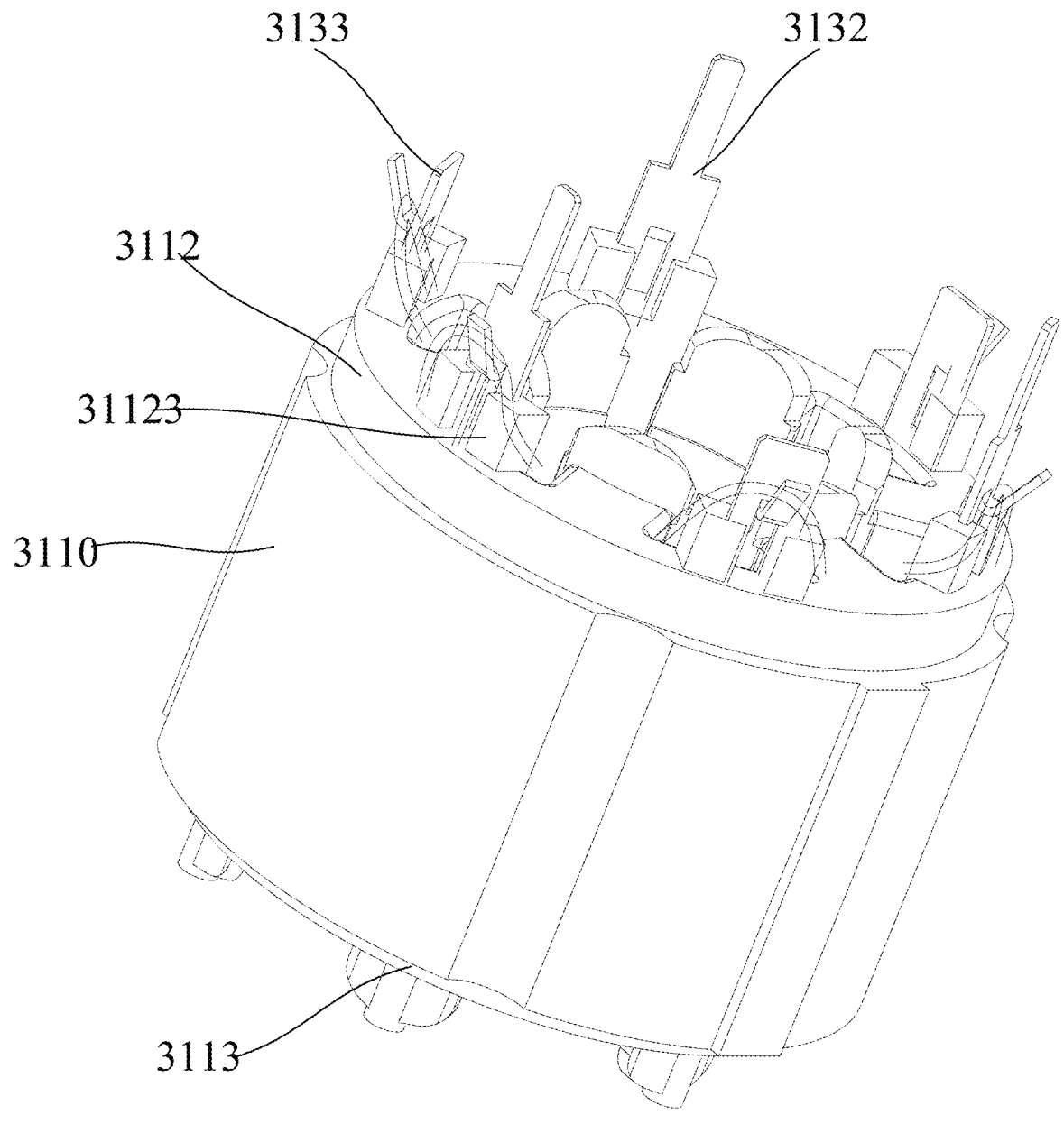
FIG. 25 is a schematic structural view of a wiring form of a connecting terminal according to an embodiment of the disclosure.

Please refer to FIG. 25. The first wiring part 31322 of the first connecting terminal 3132 is used for hanging a wiring head of the nearby winding, electrically connected with the wiring head of the nearest winding through spot welding, electrically connected with the controller through the plugging wire pin 31323, and plays a role of a power connection. The second wiring part 31332 of the third connecting terminal 3133 is used for hanging a connecting head of the nearby winding, electrically connected with the connecting head of the nearest winding through spot welding, serves as a wiring head and plays a role of a guiding wire. The above-mentioned wiring head may be a wiring head of a single winding that is separately drawn out, or may be a power connection part that needs to be connected on a wire, which means that the adjacent and parallel windings may be directly wound by one wire, and the wire between adjacent windings is directly connected with the nearest connecting terminal after winding. Then an outer insulation layer of the winding of the varnished wire will be melted off at high temperature during spot welding, so that an electrical connection can be carried out and a parallel connection can be realized. Both the first connecting terminal 3132 and the third connecting terminal 3133 are made of copper. An arrangement position of the first connecting terminal 3132 and the third connecting terminal 3133 may be set according to demand, for example, one of them is located on the first arc body 1311, and the other one is arranged on the second arc body 1312.

Please refer to FIG. 25. The above-mentioned stator assembly further includes the winding. A number of the windings corresponds to a number of the winding teeth of the stator core 3110, and the wiring head of the winding is electrically connected with the connecting terminal (not shown) nearby. The winding is wound to teeth of the plastic-coated stator by a machine, a cross-tooth winding is carried out, and stator teeth are wound in turn. The windings are wound in parallel, and the wiring head of the windings may be spot welded to the connecting terminal. A bending of the first wiring part 31322 of the first connecting terminal 3132 and a bending of the second wiring part 31332 of the third connecting terminal 3133 form hooks of the wiring heads for hooking the winding, the winding is successively hung on a hook of the copper strip piece of the bridge wire as required, and then the spot welding is performed. After spot welding, the winding of the varnished wire and the copper strip piece of the bridge wire are closely connected. The spot welding process is used for spot welding, which may not only ensure a reliability of a welding of the guiding wire, but also enable an end face of the stator assembly to be free of messy windings or varnished wire accumulation. In the stator assembly, the skeleton is embedded with the bridge wire during the injection molding, the bridge wire 3131 is the copper strip piece, the bending of the first wiring part 31322 of the first connecting terminal 3132 and the bending of the second wiring part 31332 of the third connecting terminal 3133 form the hooks of the wiring heads for hooking the winding, the winding is wound and fixed on a tooth of the plastic-coated stator (the tooth includes the first tooth 31121, the second tooth 31131, and the tooth of the stator core 3110, and the first tooth 31121 and the second tooth 31131 are respectively located on two end faces of the teeth of the stator core 3110), the wiring head of the winding is hung on the hook of the copper strip piece nearby, and a multi-tooth winding is connected in parallel. After winding, there is no need to carry out a winding wiring layout. A connector of the winding of the varnished wire is directly connected with the bridge wire through spot welding. The bridge wire is then electrically connected with the controller through the first connecting terminal, wherein, the controller is used to control an operation of the motor. Therefore, a production process of motor stator becomes more concise and simple.

In summary, the insulation and skeleton strength of the windings of the varnished wire are enhanced by the first insulator 3112 and the second insulator 3113 respectively arranged on the first end surface and the second end surface of the stator core 3110. The bridge wire 3131 is arranged inside the first insulator 3112, the connecting terminal partially exposed outside the first insulator 3112 are electrically connected with the bridge wire 3131 to realize a conductive function of the bridge wire, which eliminates complex wire connections and wiring between the windings and the controller, thereby enabling a circuit layout inside the casing to be simple and easy for later maintenance. In addition, the first insulator 3112 and the second insulator 3113 form the plastic-coated stator with the stator core 3110, and the plastic-coated stator has no risk of the creepage distance because there is no gap between the intercalated skeleton. At the same time, a wall thickness of the plastic-coated stator may be thin enough, so that an area of the stator winding groove can be large enough.

In an embodiment, after the bridge wire is made into a predetermined shape, it is placed in a mold and injection molded, and some of the first connecting terminals and third connecting terminals on the bridge wire are injection molded into the stator stably and reliably. The stator body, injection molding material, and bridge wire are tightly fixed together through the mold using the high-pressure injection machine. The bridge lines are completely injection molded into the material, and the gap between adjacent bridge lines is guaranteed to be more than 1 mm. When winding the varnished wire, the varnished wire is connected with a nearest terminal, and there is no need to connect across teeth and grooves. The stator assembly is provided with a smooth surface and a simple wiring. An open wire running from the end face in the traditional way is placed on a dark wire in a center of the first insulator 3112. This design can not only meet safety requirements, but also avoid a problem of wire damage during operation.

Please refer to FIG. 1 through FIG. 10. In an embodiment, the dividing plate 2 is provided with a plurality of concave areas 21, the concave area 21 is concave from the first cavity 101 to the second cavity 102, and protrudes towards the second cavity 102 to form a first boss 211, the plurality of concave areas 21 are evenly distributed at an edge of the dividing plate 2 along a circumferential direction, an inner wall of the housing 1 in the first cavity 101 is provided with concave grooves 103, the number of the concave grooves 103 is corresponding to a number of concave areas 21, and the concave grooves 103 communicate with the corresponding concave areas 21. The concave area 21 is used to place the insulating bracket 314, and the concave area 21 is used to match the insulating bracket 314, which ensures that there is a sufficient creepage distance when the stator core and the varnished wire are matched to meet safety regulations.

Please refer to FIG. 1 through FIG. 10. In an embodiment, the first connecting terminal 3132 is provided in the concave area 21, and the concave area 21 located at the first connecting terminal 3132 is provided with a through hole 212 for the first connecting terminal 3132 to pass through.

Figure 6:
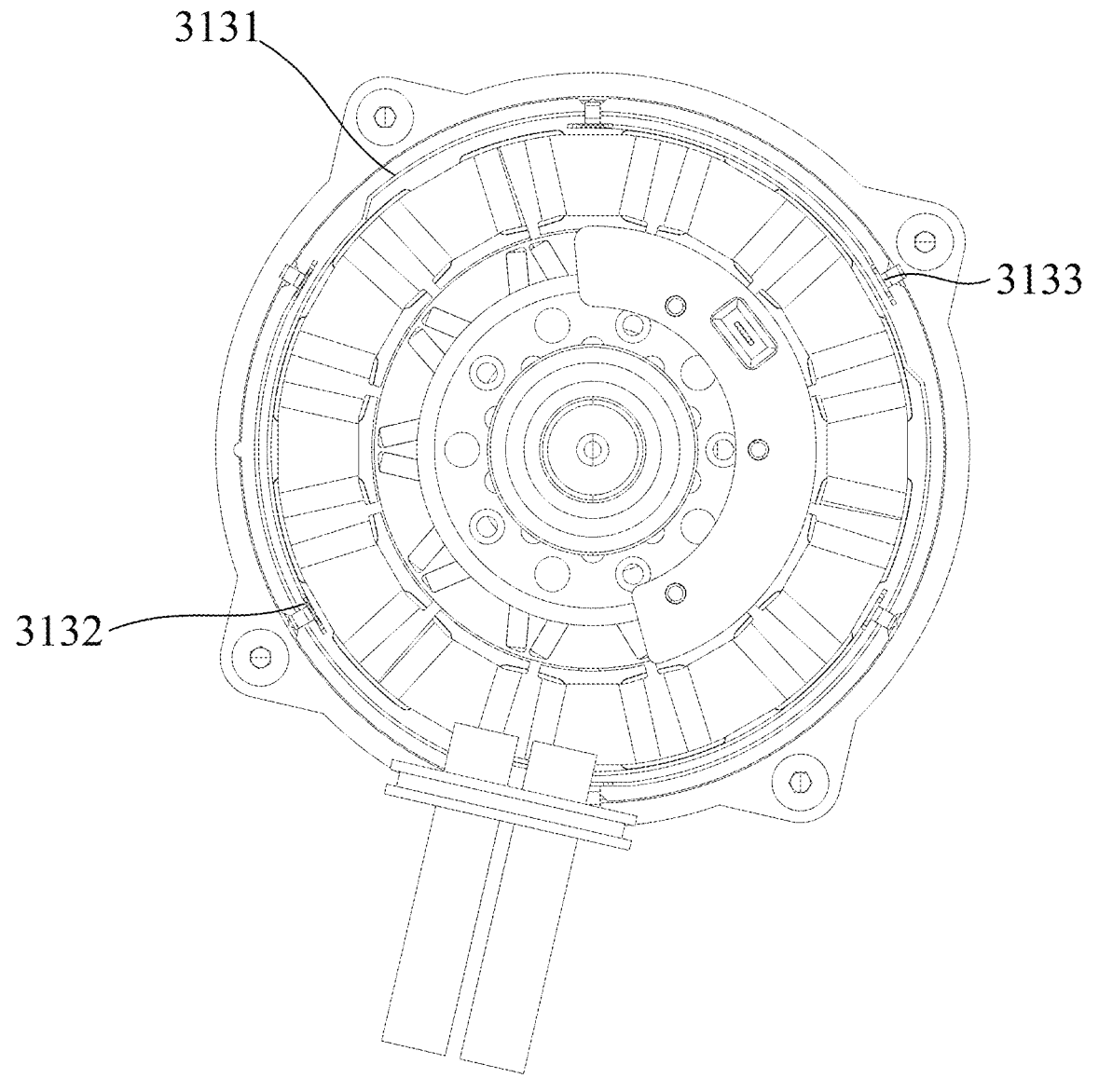
FIG. 6 is a schematic structural view of FIG. 5 after removing an insulating bracket.
Figure 7:
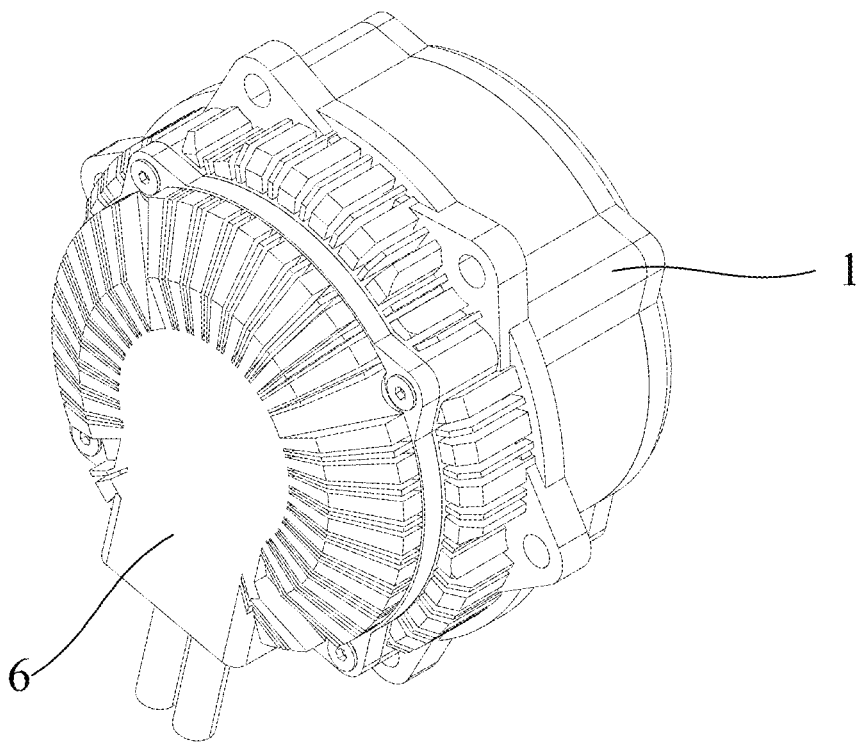
FIG. 7 is a perspective schematic structural view of the DC brushless motor according to an embodiment of the disclosure.
Figure 8:
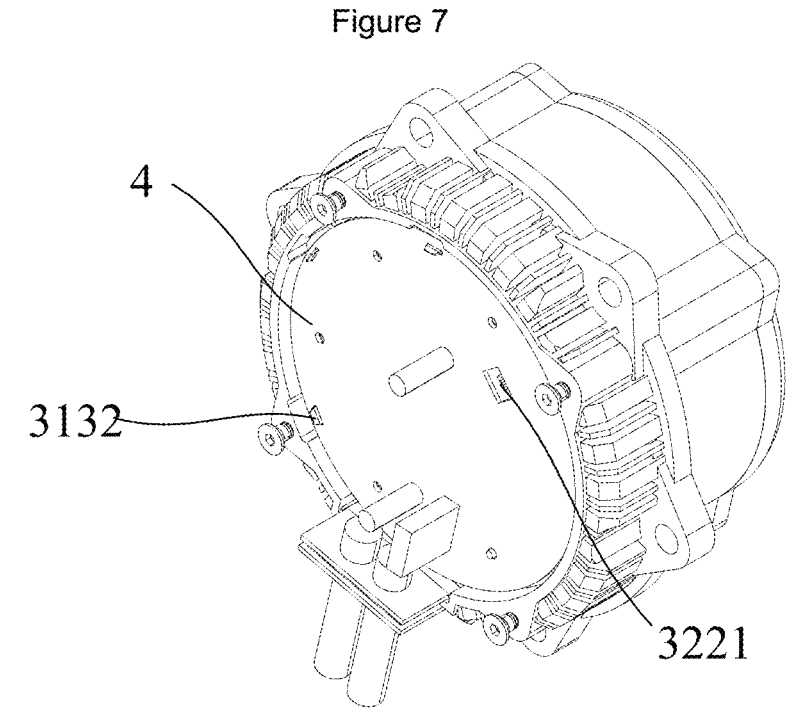
FIG. 8 is a schematic structural view of FIG. 7 after removing a second cover and exposing the control board.
Figure 9:
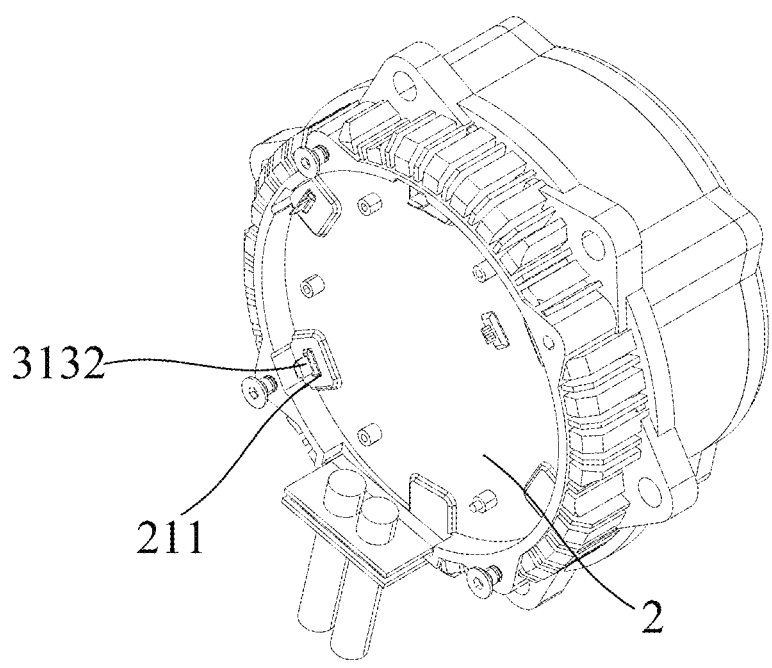
FIG. 9 is a schematic structural view of FIG. 8 after removing the control board.

Please refer to FIG. 5 through FIG. 6. An end of the third connecting terminal 3133 connected with the bridge wire 3131 is located inside the first insulator 3112, and an end of the third connecting terminal 3133 away from the bridge wire 3131 is exposed on an outside of the first insulator 3112. Both the first connecting terminal 3132 and the third connecting terminal 3133 are provided with a hook 7.

Please refer to FIG. 1 through FIG. 12. The rotor assembly 32 includes a rotor 321 and a magnetic sensor 322 arranged on the rotor 321, and an end of the second connecting terminal 3221 facing the first cover 5 is electrically connected with the magnetic sensor 322. One end of the second connecting terminal 3221 facing the second cover 6 passes through the dividing plate 2 and is electrically connected to the control board 4. The dividing plate 2 is provided with a through hole for the second terminal 3221 to pass through. The second connecting terminal 3221 is sleeved with an insulating clamping component 8, the insulating clamping component 8 is clamped in the above-mentioned through hole, and the second connecting terminal 3221 is electrically connected with the control board 4 through the insulating clamping component 8. For example, an end of the second connecting terminal 3221 away from the magnetic sensor 322 is welded on the control board 4. The magnetic sensor 322 may be a Hall element.

Figure 13:
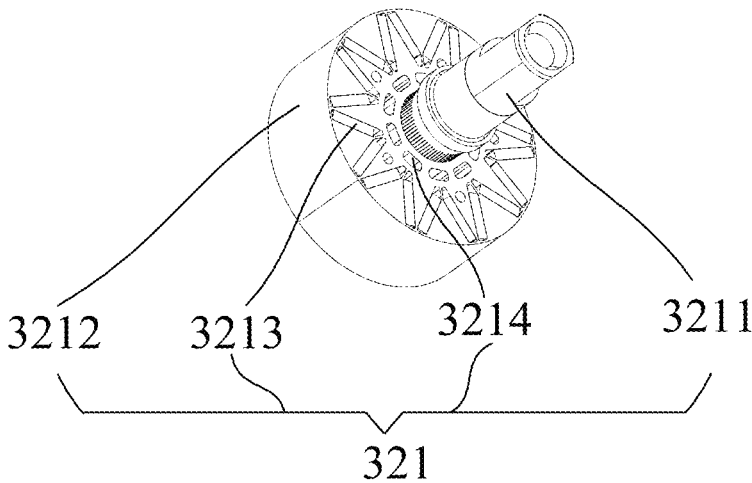
FIG. 13 is a perspective schematic structural view of a rotor assembly according to an embodiment of the disclosure.
Figure 14:
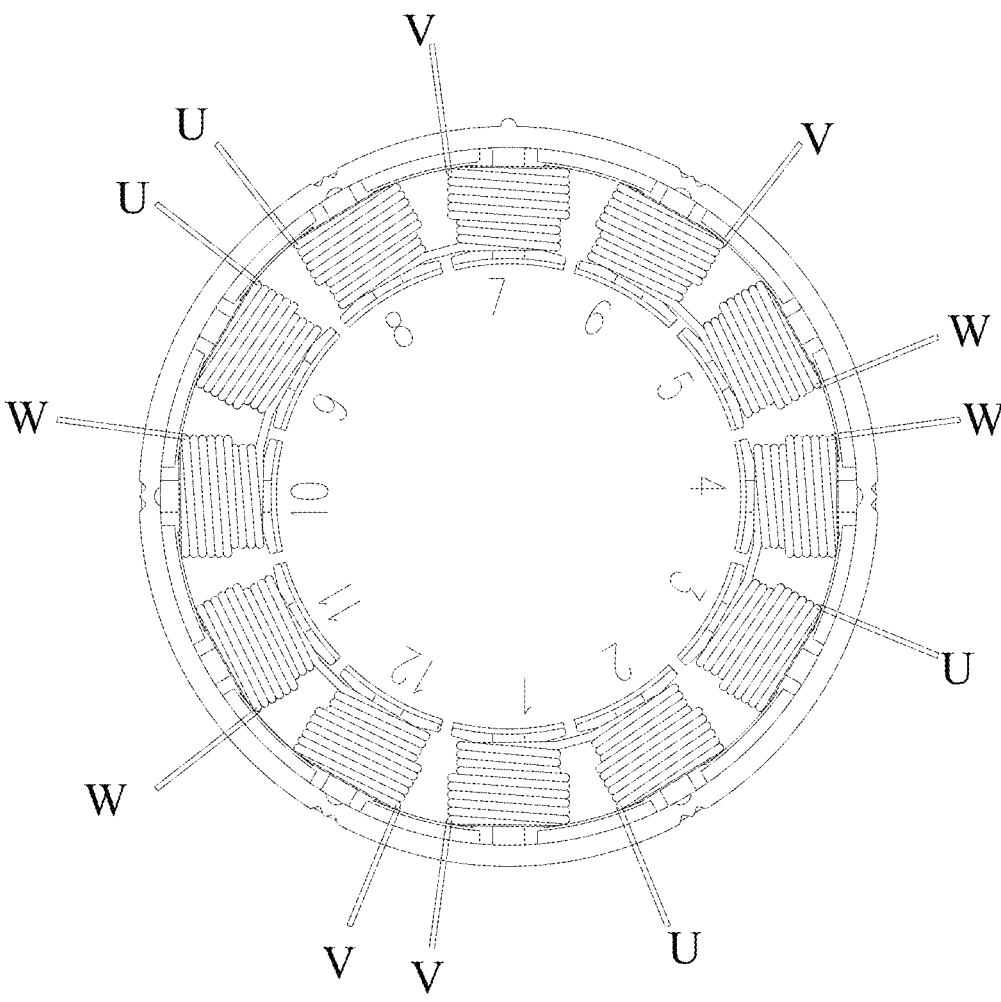
FIG. 14 is a schematic view of a wiring of a winding according to an embodiment of the disclosure.

Please refer to FIG. 13. The rotor 321 includes a rotating shaft 3211 and a rotor core 3212. There is a BMC layer between the rotating shaft 3211 and the rotor core 3212, and the BMC layer is made of BMC (bulk molding compound) material. The rotating shaft 3211 is arranged inside the rotor core 3212, two ends of the rotating shaft 3211 are provided with bearings, and the bearings are respectively mounted on the dividing plate and the first cover through a bearing base. The rotor core 3212 is provided with a magnetic groove 3213 and a magnetic isolation groove 3214. The magnetic groove 3213 is used to mount permanent magnets.

Figure 10:
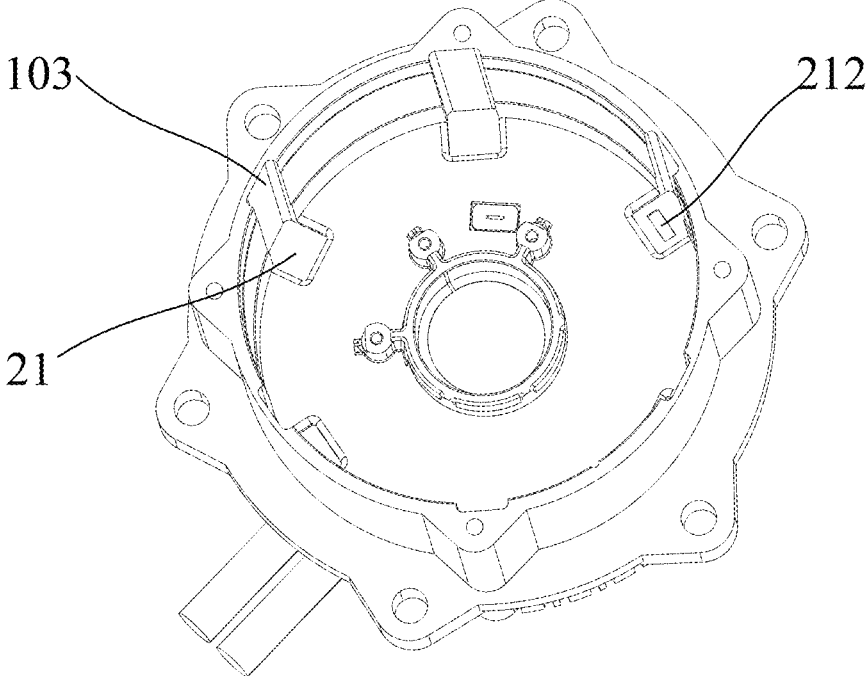
FIG. 10 is a schematic structural view of the housing from one side of a motor assembly according to an embodiment of the disclosure.

Please refer to FIG. 10. In an embodiment, the dividing plate 2 and the housing 1 are in an integrally formed structure. Wherein, the concave groove 103 and the concave area 21 are made by a stamping process.

Figure 15:
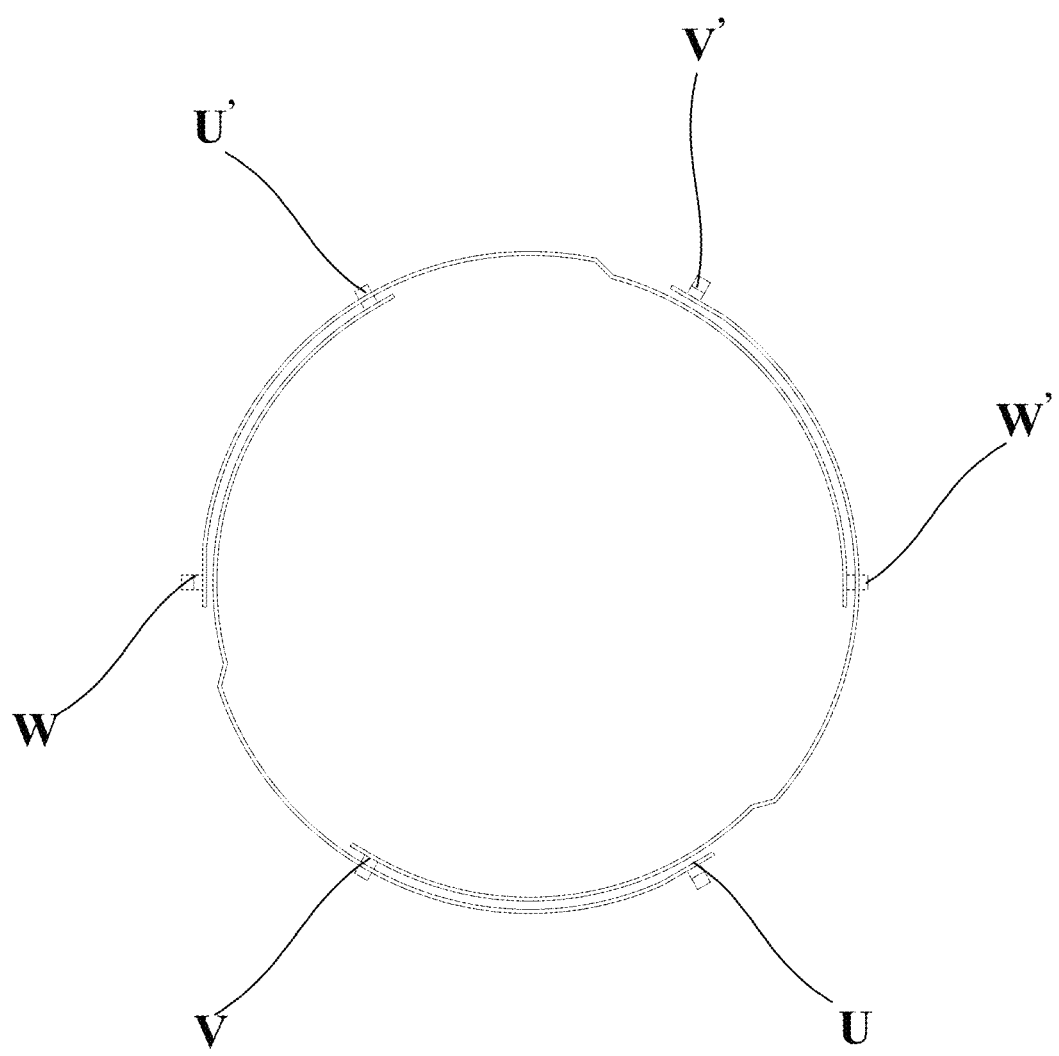
FIG. 15 is a schematic structural view of an arrangement of three bridge wires according to an embodiment of the disclosure.

Please refer to FIG. 4 through FIG. 16. In FIG. 15, U, V, and W represent the first connecting terminals of U-phase, V-phase, and W-phase respectively. U', V', and W' represent the third connecting terminals of U-phase, V-phase, and W-phase respectively. The stator body 3111 is provided with twelve stator cores for winding twelve varnished wires. The twelve varnished wires are numbered 1 to 12 respectively. Wherein, varnished wire 1 are electrically connected with varnished wire 2, varnished wire 3 are electrically connected with varnished wire 4, varnished wire 5 are electrically connected with varnished wire 6, varnished wire 7 are electrically connected with varnished wire 8, varnished wire 9 are electrically connected with varnished wire 10, varnished wire 11 are electrically connected with varnished wire 12. Varnished wires 2 and 3 are connected with the first connecting terminal of U phase, varnished wires 8 and 9 are connected with the third connecting terminal of U phase, varnished wires 12 and 1 are connected with the first connecting terminal of V phase, varnished wires 6 and 7 are connected with the third connecting terminal of V phase, varnished wires 10 and 11 are connected with the first connecting terminal of W phase, and varnished wires 4 and 5 are connected with the third connecting terminal of W phase.

It should be noted that a power connection part not described in detail in this technical scheme may be a conventional setting mode of the DC brushless motor, which will not be repeated here, and the DC brushless motor is also suitable for a disclosure with a Hall control and a motor without Hall control.

The DC brushless motor provided by the disclosure is suitable for all kinds of devices suitable for mounting the DC motors, such as various garden tools involved in a field of gardening: washing machine, lawn mower or air compressor, etc., especially suitable for a cutter of mower.

Figure 26:
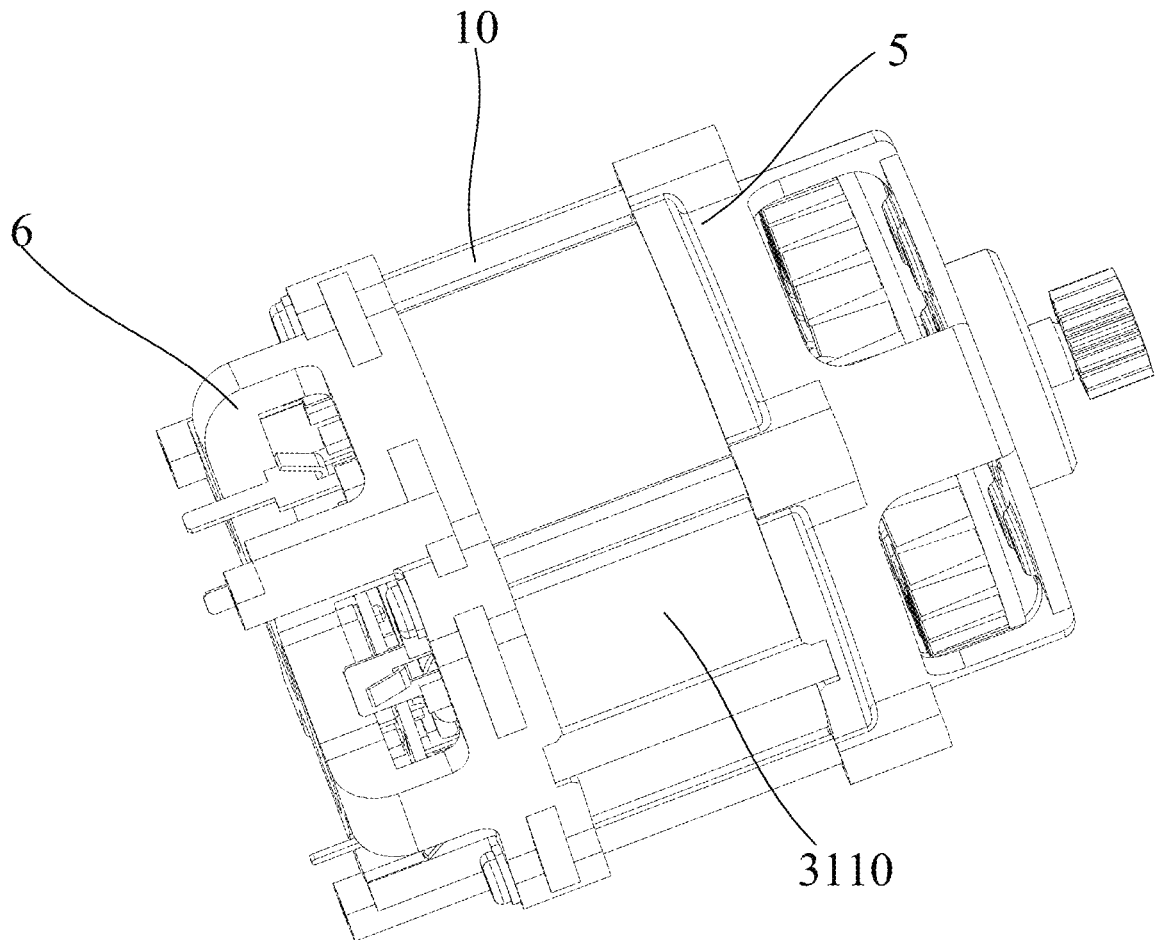
FIG. 26 is a schematic structural view of a motor according to an embodiment of the disclosure.
Figure 27:
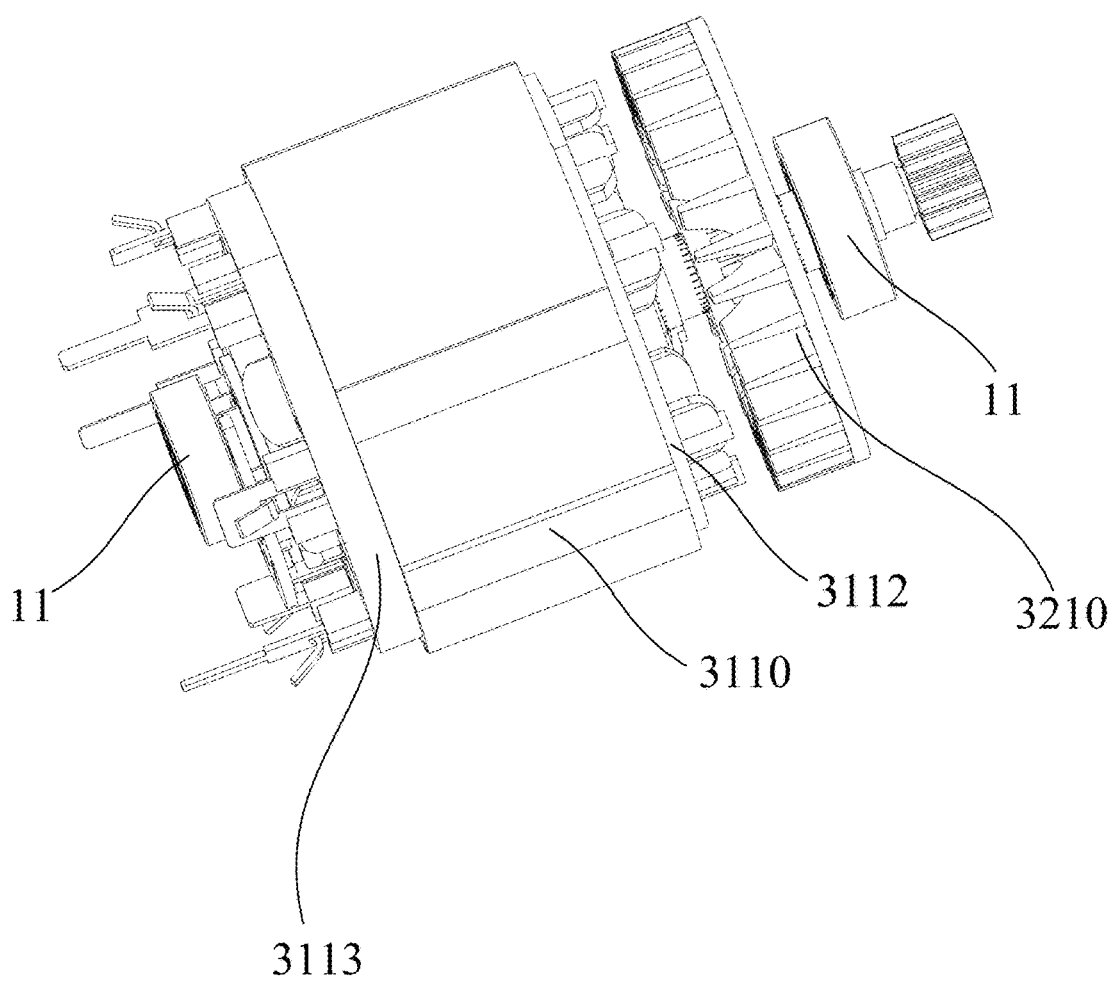
FIG. 27 is an assembling view of the stator assembly and the rotor assembly according to an embodiment of the disclosure.
Figure 28:
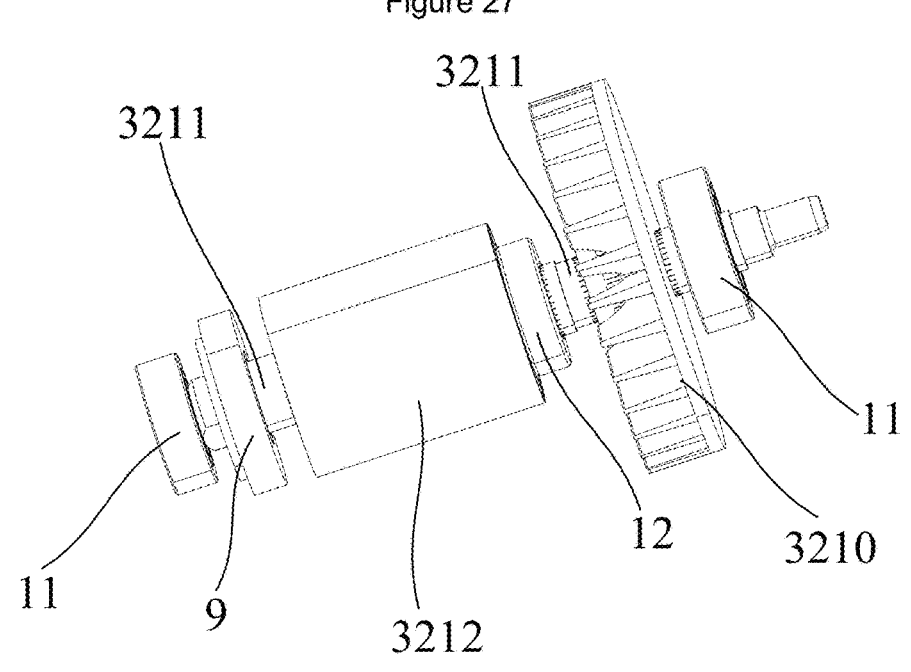
FIG. 28 is a schematic structural view of the stator assembly according to an embodiment of the disclosure.

Please refer to FIG. 26 through FIG. 28. The disclosure further provides a motor. The motor is provided with a first cover 5, a second cover 6, the stator assembly and the rotor assembly, the rotor assembly is rotatably mounted in an inner cavity of the stator assembly, the stator assembly is the stator assembly mentioned above, the first cover 5 and the second cover 6 are respectively arranged on two end faces of the stator core of the stator assembly, and the first cover 5 is fixed with the second cover 6 through a fixing bolt 10.

Compared with the conventional intercalated motors, the motor mentioned above has higher production efficiency and yield rate in the production process since the production process of the stator assembly is simple, and the insulation performance is excellent.

Please refer to FIG. 28. In an embodiment, the rotor assembly includes the rotor core 3212 and the rotating shaft 3211 mounted in an inner cavity of the rotor core 3212, an insulating layer is arranged on the rotating shaft 3211, and the insulating layer at least covers a matching surface (not shown) of the rotor core and the rotating shaft. The insulating layer insulates and isolates the rotor core 3212 from the rotating shaft 3211 to strengthen the insulation and ensure a safety of an output end of a rotating shaft of the motor, so as to meet a high voltage design of the motor.

In an embodiment, the insulating layer is a BMC (Bulk Molding Compound) layer. The rotor core 3212 and the rotating shaft 3211 are integrated through die-casting of BMC powder. The BMC material is fully filled between the rotating shaft 3211 and the rotor core 3212, which can not only enable the rotating shaft 3211 and the rotor core 3212 to be isolated and insulated, but also enable the rotating shaft 3211 of the motor and the rotor core 3212 not to directly contact. In this way, it can not only meet insulation requirements of the motor, but also meet impact requirements of a rotation of the motor.

The stator assembly and the rotor assembly mentioned above form a double insulating structure, which may ensure a safety of the motor output rotating shaft, and through this scheme, a high-voltage motor may be manufactured. At the same time, the stator assembly may be made overall simple, and the production process is simple and a degree of mechanization is high, which is conducive to improving production efficiency and economic benefits.

Please refer to FIG. 28. In an embodiment, a fan 3210 is mounted on the rotating shaft 3211, and the fan 3210 is located between the rotor core 3212 and an output end of the rotating shaft. At least two bearings 11 are further mounted on the rotating shaft 3211. The rotating shaft 3211 is further provided with a balance ring 12, and the balance ring 12 is arranged between the rotor core 3212 and the fan 3210. The rotating shaft 3211 is further provided with an induction magnetic ring 9.

Figure 30:
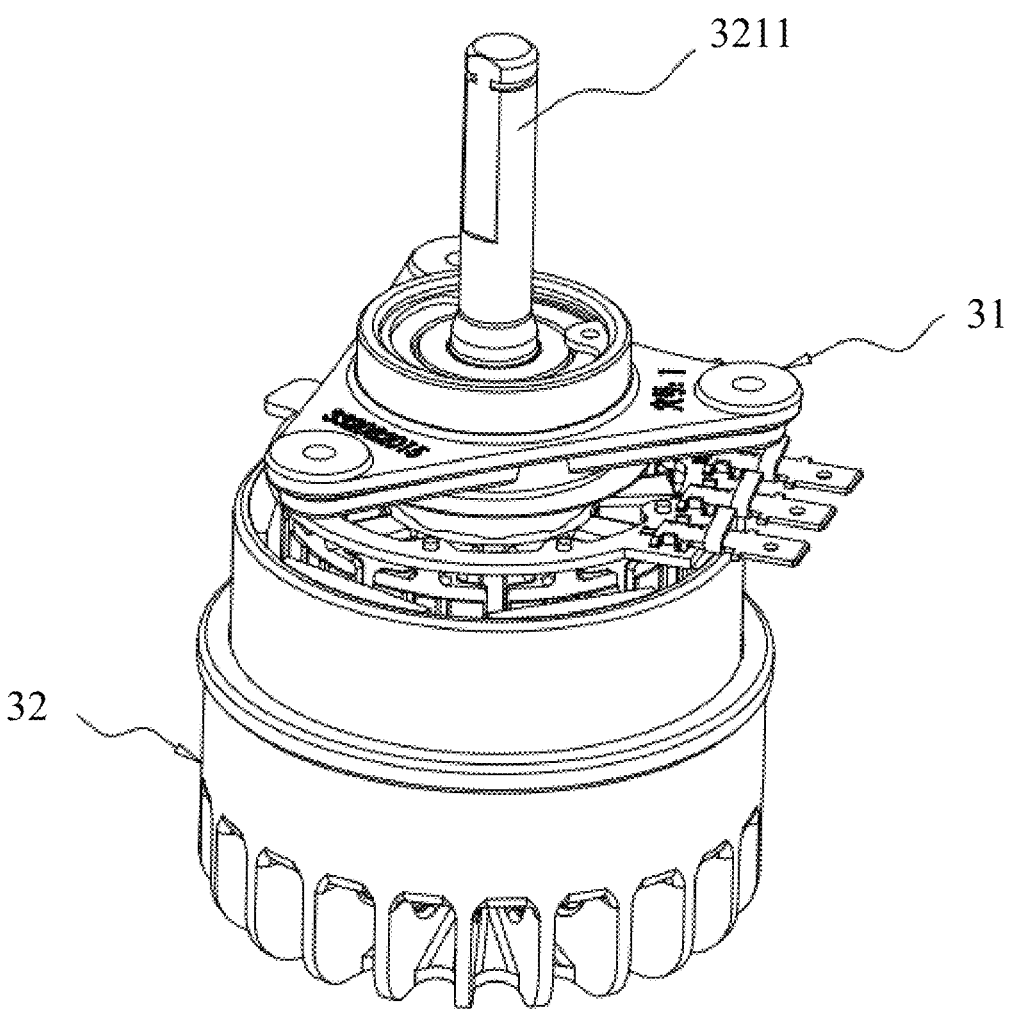
FIG. 30 is an isometric view of the motor.
Figure 31:
FIG. 31 is an isometric view of the stator assembly of the motor.
Figure 31:
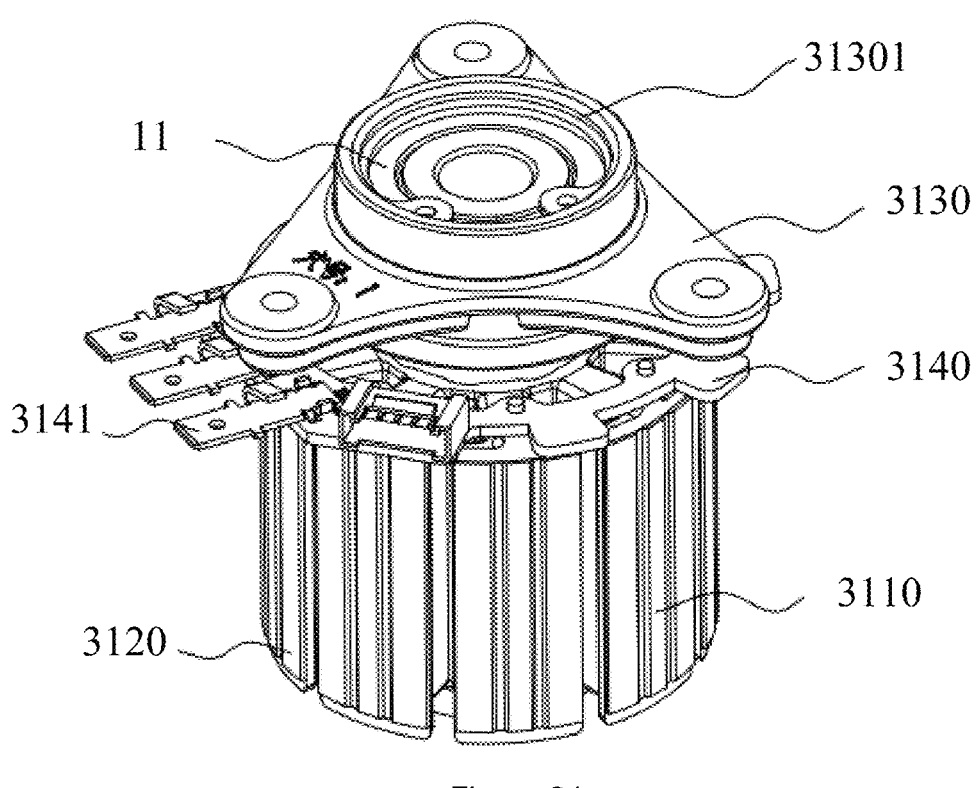
Figure 32:
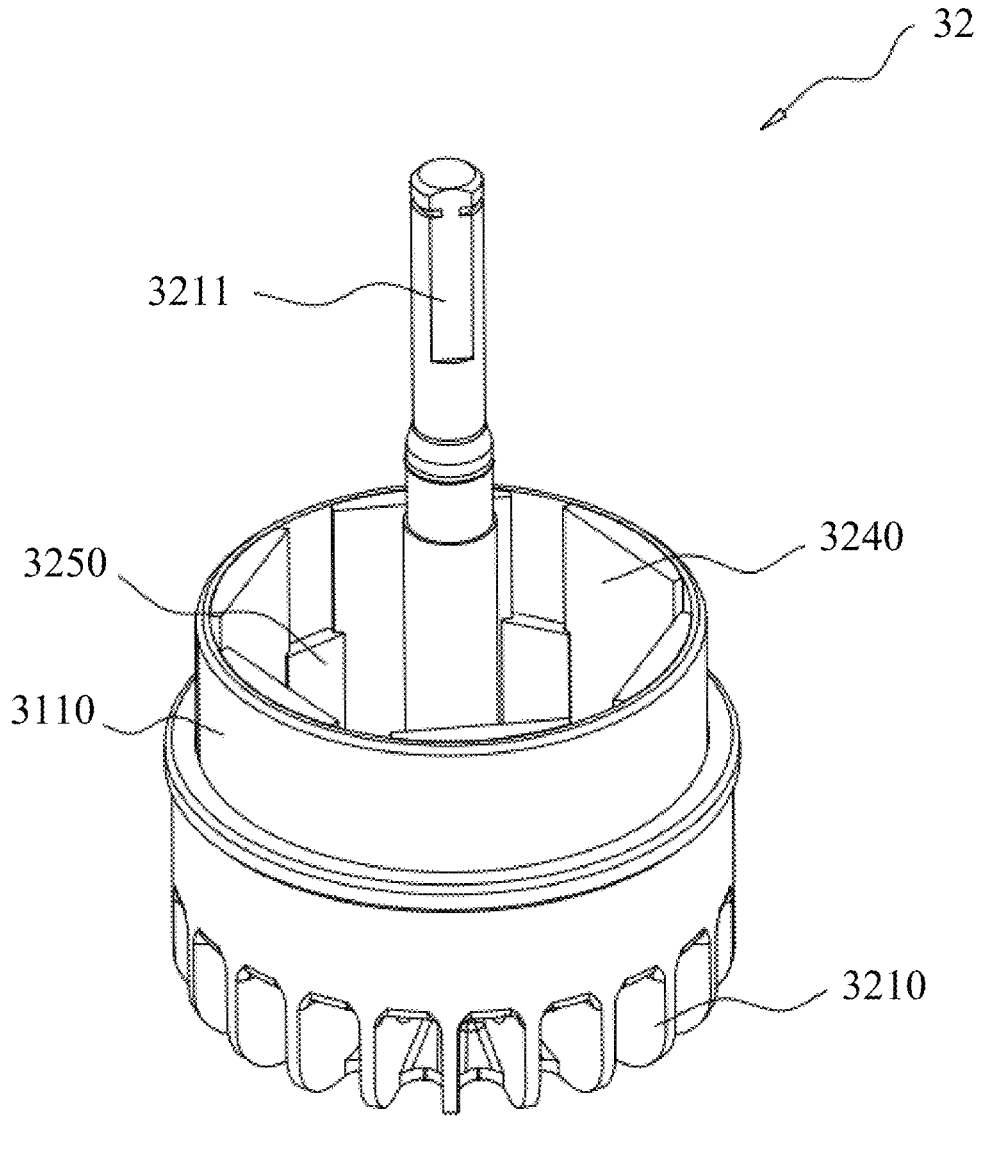
FIG. 32 is an isometric view of the rotor assembly of the motor.

Please refer to FIG. 30 through FIG. 32. The disclosure further provides a motor. The motor includes the rotor assembly 32 and the stator assembly 31. The motor may be a DC brushless motor with an external rotor, a high-speed motor, a motor with emergency shutdown, a motor with mechanical brake, a DC brushless motor of a chainsaw, a DC brushless motor of a snow thrower, a DC brushless motor of a snow thrower, a DC brushless motor of a lawn mower, and so on.

Please refer to FIG. 30 and FIG. 31. The rotor assembly 32 may rotate relative to the stator assembly 31. In this embodiment, the stator assembly 31 includes the stator core 3110, a winding bracket 3120 and a fixing bracket 3130. The winding bracket 3120 is used for accommodating the stator core 3110, and the stator core 3110 and the winding bracket 3120 are fixed by injection molding, so that when the rotor assembly 32 needs to rotate at high speed, the stator core 3110 can be fixed more firmly.

Please refer to FIG. 31. A first end of the fixing bracket 3130 is penetrated into the winding bracket 3120 provided with the stator core 3110, so that the stator core 3110 and the winding frame 3120 will not rotate relative to the fixing bracket 3130. A second end of the fixing bracket 3130 is used for connecting with an external component to fix the stator assembly 31 with the external component. A top of the fixing bracket 3130 is provided with an accommodating hole concaving downwardly, a connecting bearing 11 is mounted in the accommodating hole, and it is coaxially fixed with the rotating shaft 3211.

Please refer to FIG. 31. The stator assembly 31 further includes a hall assembly 3140, the hall assembly 3140 may be fixedly connected with the winding bracket 3120, and the hall assembly 3140 is roughly in a circular shape. One side of the hall assembly 3140 is further provided with a plurality of terminals 3141. In this embodiment, a number of terminals 3141 is three, and each terminal 3141 is used for electrically connecting with a stator winding.

Please refer to FIG. 30 and FIG. 32. The rotor assembly 32 includes a casing 3230 and a magnetic tile 3240 embedded in the casing 3230. Wherein, the casing 3230 is arranged in a hollow cylindrical shape as a whole, and the casing 3230 and the fan 3210 mentioned below are integrated. The rotor assembly 32 further includes a magnetic tile spacer 3250 for spacing the magnetic tile 3240.

Please refer to FIG. 30 and FIG. 32. A first end of the rotating shaft 3211 has an interference fit with the fan 3210, so that the fan 3210 can withstand relatively large torque and relatively large impact. A second end of the rotating shaft 3211 passes through the winding bracket 3120 and the fixing bracket 3130 and protrudes from a top end of the fixing bracket 3130, and the rotating shaft 3211 further passes through the connecting bearing 11. Thus, on one hand, the stator assembly 31 may be connected with the rotor assembly 32 by utilizing the rotating shaft 3211, and on the other hand, when the motor starts, the rotor assembly 32 may be driven to rotate by the rotating shaft 3211.

Please refer to FIG. 32. An inner wall of the casing 3230 is fixed with the magnetic tile spacer 3250 for mounting the magnetic tile 3240. In this embodiment, there are six magnetic tile spacers 3250 arranged along an arc direction of the inner wall of the casing 3230, and the six magnetic tile spacers 3250 are arranged at intervals. The magnetic tiles 3240 correspond to the magnetic tile spacers 3250 one-to-one, and the magnetic tile 3240 is mounted between two adjacent magnetic tile spacers 3250.

Please refer to FIG. 30. A bearing chamber 31301 is arranged in the stator assembly 31, and is located between the stator assembly 31 and the rotating shaft 3211, the bearing chamber 31301 is used for mounting the rotating shaft 3211, and the bearing chamber 31301 and the rotating shaft 3211 are rotatably connected through the bearing.

Please refer to FIG. 33 through FIG. 36. The motor further includes the rotating shaft 3211, which penetrates inside the stator assembly 200. The fan 3210 is coaxially fixed at one end of rotating shaft 3211. A fastening key 3215 is pressed and connected at a connection between the rotating shaft 3211 and the fan 3210, and is used to realize a secondary tightening between the rotating shaft 3211 and the fan 3210.

Figure 34:
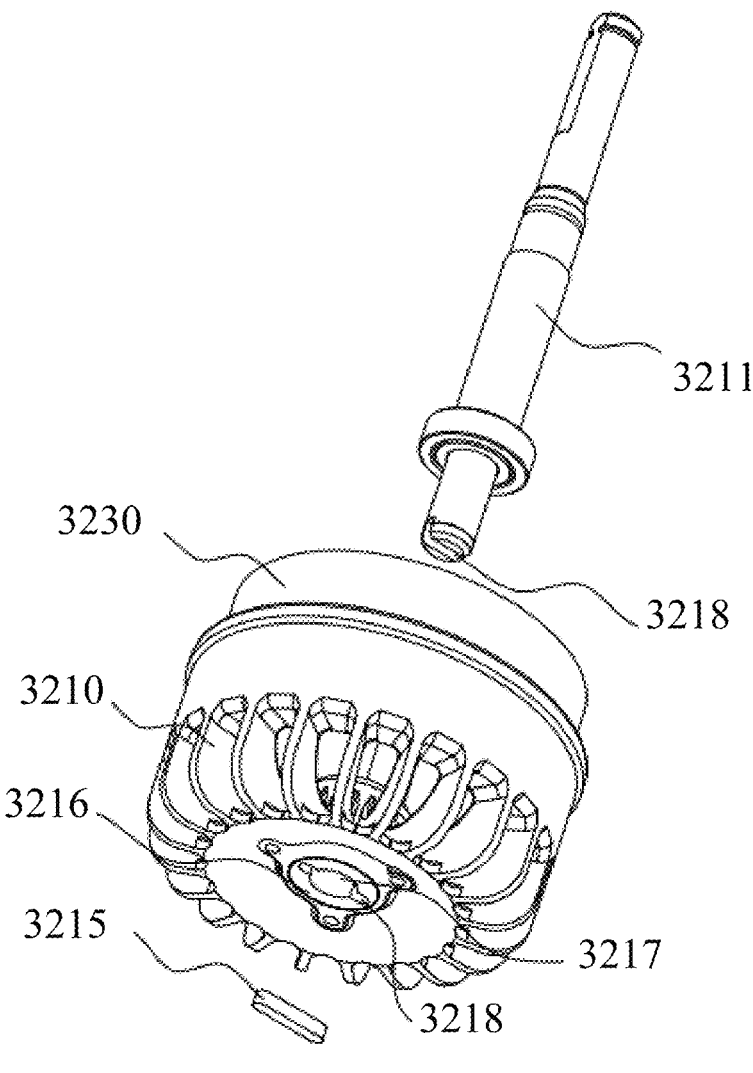
FIG. 34 is an exploded view of a fan mounting structure in the motor.
Figure 35:
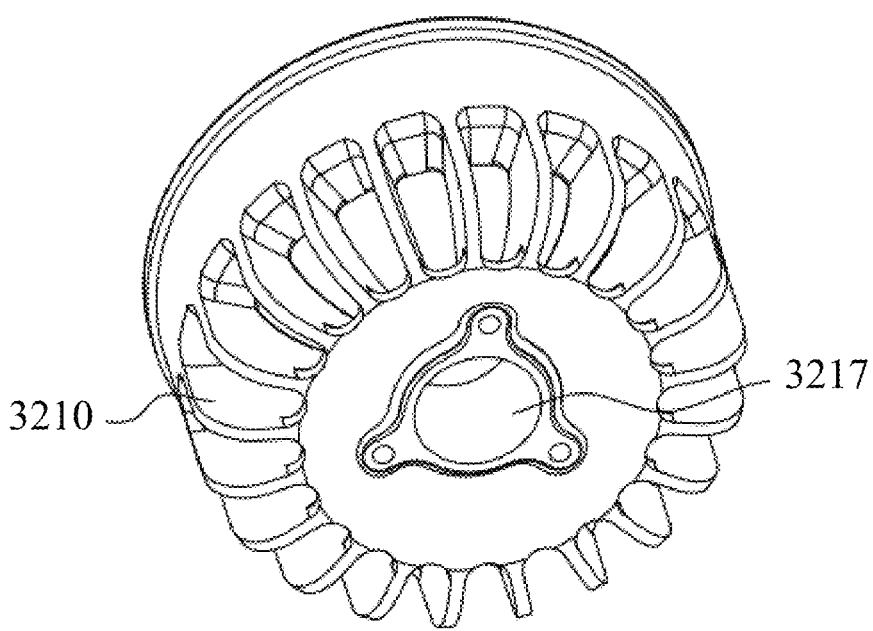
FIG. 35 is a schematic structural view of the fan in the motor.

Please refer to FIG. 34 and FIG. 35. The fan 3210 is sleeved on an outside of the rotor assembly of the motor, and is rotatably connected with the motor by the rotating shaft 3211, a central axis position of the fan 3210 is provided with an insert 3216, and the insert 3216 is fixed to the fan 3210 by casting. A rough surface may be arranged on an interface of a connection between the insert 3216 and the fan 3210, so that an adhesion between the insert 3216 and the fan 3210 is further increased, the insert 3216 may be cylindrical, and its axis is in a same direction with a central axis of the fan 3210. A mounting hole 3217 is arranged along an axis direction of the insert 3216, the mounting hole 3217 penetrates along the axis direction of the insert 3216, and the fan 3210 is coaxially fixed with the rotating shaft 3211 through the mounting hole 3217.

Figure 33:
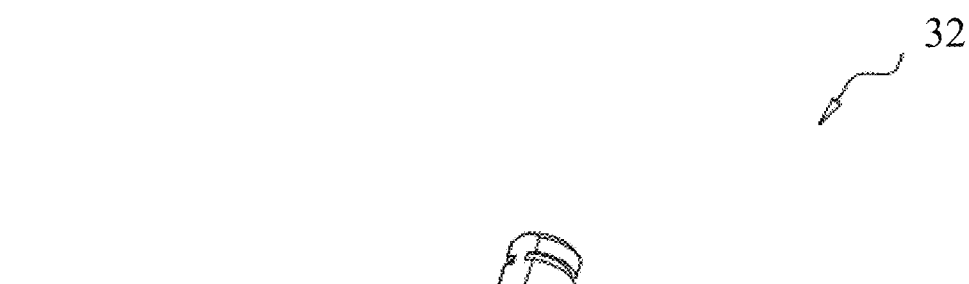
FIG. 33 is an isometric view of a fan mounting structure in the motor.
Figure 33:
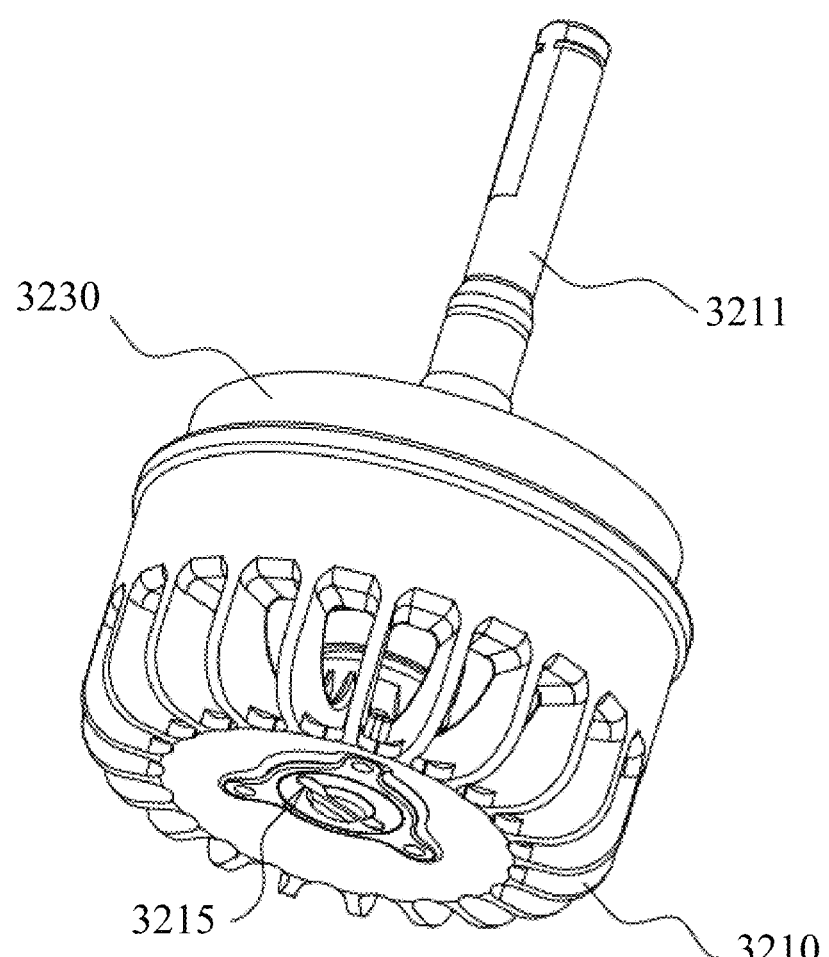

Please refer to FIG. 33. The fan 3210, an end cover of the motor and a motor housing are in an integrated structure. In an embodiment of the disclosure, the fan 3210 is made of aluminum alloy, and the insert 3216 is made of iron. Because a torque of a contact position between the rotating shaft 3211 and the fan 3210 is larger and a strength of the aluminum alloy is lower, the fan 3210 and the insert 3216 are both made of iron alloy, which cause that a weight is larger, and an energy consumption of the motor is increased.

Figure 36:
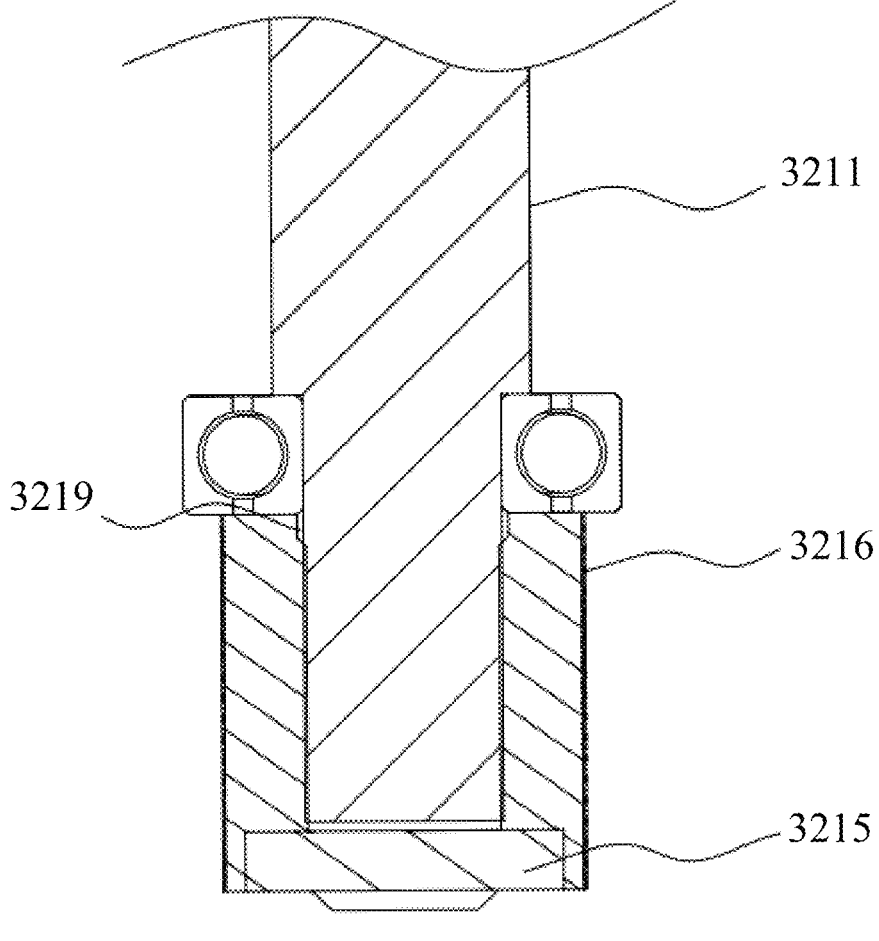
FIG. 36 is a partial cross-sectional view of the fan mounting structure in the motor.

Please refer to FIG. 34 and FIG. 36. One end of a connection between the rotating shaft 3211 and the fan 3210 is provided with a groove and is located in a middle position of one end of the rotating shaft 3211, a length direction of the groove is perpendicular to an axis direction of the rotating shaft 3211, and two sides on the length direction of the groove are openly arranged. A groove is also arranged on the insert 3216, and the groove on the insert 3216 is located on both sides of the length direction of the groove on the rotating shaft 3211 and are communicated with the groove on the rotating shaft 3211 to form a crimping groove 3218. The crimping groove 3218 is matched with a shape and size of the fastening key 3215, a length of the fastening key 3215 is greater than a diameter of the rotating shaft and smaller than an outer diameter of the insert 3216, and the fastening key 3215 is mounted in the crimping groove 3218 through a press-fitting process.

Through the above description, the rotating shaft 3211 and the fan 3210 are connected with the fastening key 3215 at one end to carry out a secondary fastening connection, an adhesion between the rotating shaft 3211 and the fan 3210 may be increased, so as to reduce an occurrence of matching failure between the rotating shaft 3211 and the fan 3210 when the motor is subjected to a strong impact, and guarantee a stability of the connection between the rotating shaft 3211 and the fan 3210.

Please refer to FIG. 33 and FIG. 36. An assembly process between the mounting hole 3217 and the rotating shaft 3211 on the insert 3216 is an interference fit. In this embodiment, a diameter of the mounting hole 3217 is 10 mm, and its tolerance range is from –0.06 mm to –0.08 mm. The diameter of the rotating shaft 3211 is 10 mm, and its tolerance range is from –0.003 mm to +0.005 mm. And a maximum interference $Y_{max}$ between the mounting hole 3217 and the rotating shaft 3211 is 0.085 mm, and a minimum interference $Y_{min}$ is 0.057 mm. An interference range between the mounting hole 3217 and the rotating shaft 3211 is an optimal choice, and if the interference between the rotating shaft 3211 and the mounting hole 3217 is increased, the rotating shaft 3211 will be shoveled during mounting, a size of the rotating shaft 3211 is changed, and then an assembly between the rotating shaft 3211 and the fan 3210 is more likely to fail.

Through the above description, the rotating shaft 3211 and the insert 3216 on the fan blade 3210 are mounted through an interference fit of a hole and a shaft, this press-fitting process is relatively mature, and in an actual production, the production efficiency is higher. In addition, this connection method has characteristics of simple structure, good centering, high load-bearing capacity, capable of withstanding impact loads, and easy disassembly and maintenance.

Please refer to FIG. 36. One end of the insert 3216 away from the fastening key 3215 forms a guiding groove 3219 which is located on an inner hole wall of the insert 3216. In a mounting process of the rotating shaft 3211 and the fan 3210, the rotating shaft 3211 is pressed and mounted into the mounting hole 3217 of the insert 3216, and the guiding groove 3219 may play a guiding role for the rotating shaft 3211, so that the rotating shaft 3211 is embedded into the mounting hole 3217 and a mounting convenience is improved.

In summary, through the above description, the rotating shaft 3211 and the fan 3210 are connected with the fastening key 3215 at one end to carry out a secondary fastening connection, an adhesion between the rotating shaft 3211 and the fan 3210 may be increased, so as to reduce an occurrence of matching failure between the rotating shaft 3211 and the fan 3210 when the motor is subjected to a strong impact, and guarantee a stability of the connection between the rotating shaft 3211 and the fan 3210. Therefore, this disclosure effectively overcomes various shortcomings in the conventional art and has a high degree of industrial utilization value.

In summary, beneficial effects of this disclosure are as follows: the plastic-coated stator 311 is embedded with a bridge wire 3131 during plastic coating, the first connecting terminal 3132 and the third connecting terminal 3133 are arranged on the bridge wire 3131, and the first connecting terminal 3132, the third connecting terminal 3133 and the plastic-coated stator 311 are matched and used for connecting the varnished wire. The varnished wire is wound on the teeth of the plastic-coated stator 311, and the varnished wire is hung on the hook of the first connecting terminal 3132 and the third connecting terminal 3133. At the same time, the varnished wire of the motor adopts a parallel winding method, which is paralleled by multi-tooth winding. The traditional method is to leave wire ends longer and bend them to a required position at one end of the stator. This causes the wires to be concentrated on one end of the stator assembly, and a large number of varnished wires are super-imposed. Compared with the traditional method, this disclosure injects the bridge wire into the skeleton, which not only satisfies performance requirements of the wire crossing, but also enables the end face to be simple and clean. At the same time, the copper strip is buried deep in the injection molding, which is not only fastened, but also may ensure an insulation distance of an overpower, and meets requirements of safety standards.

A traditional stator main wire is drawn out, and an insulated wire is used to enable the copper strip to connect with the varnished wire. Boring and tin processing is used at knotted areas to enable them to be tightly connected. In the disclosure, after the stator assembly is wound, the varnished wire is hung on the hook 7 and the spot welding is carried out. The varnished wire is hung into a copper strip hook, and then the spot welding process is used for spot welding, which may not only ensure a reliability of the guiding wire welding, but also may have no messy varnished wire accumulation on the end face of the stator assembly.

At the same time, the rotor assembly of the traditional DC brushless motor uses a punching process to enable the rotating shaft and the rotor core to be in an interference match. However, this process cannot meet requirements of high-voltage motor design. The rotor assembly of the disclosure is also plastic-coated, so as to ensure a safety of the output shaft. And a layer of BMC material is added between the rotating shaft 3211 and the rotor core 3212, so that the rotating shaft of the motor and the rotor core are not in direct contact. And they are isolated and insulated through BMC material. The BMC material is fully filled between the rotating shaft and the rotor core, which may not only meet insulation requirements of the motor, but also meet impact requirements of a rotation of the motor.

What is claimed is:

1. A DC brushless motor, comprising:
a housing, comprising a housing body;
a motor assembly, arranged in the housing, and a connecting terminal being connected to the motor assembly;
a control board, arranged in the housing, and electrically connected with the connecting terminal; and
a dividing plate, arranged in the housing and configured to divide the motor assembly from the control board; wherein
the dividing plate is arranged in the housing body, the dividing plate divides a cavity of the housing body into a first cavity and a second cavity, the dividing plate is provided with a plurality of concave areas, the concave area is concave from the first cavity to the second cavity, and protrudes towards the second cavity to form a first boss, the plurality of the concave areas is evenly distributed at an edge of the dividing plate along a circumferential direction, an inner wall of the housing in the first cavity is provided with concave grooves of which a number is corresponding to a number of the concave areas, and the concave grooves communicate with the corresponding concave areas.

2. The DC brushless motor according to claim 1, wherein the housing comprises a first cover and a second cover, the first cover and the second cover are respectively arranged at two ends of the housing body, the motor assembly is arranged in the first cavity, the control board is arranged in the second cavity, and the connecting terminal is configured to penetrate out of a through hole on the dividing plate to be electrically connected with the control board.

3. The DC brushless motor according to claim 2, wherein the motor assembly comprises a stator assembly and a rotor assembly, the rotor assembly is rotatably arranged inside the stator assembly, and the connecting terminal comprises three first connecting terminals connected with the stator assembly and one second connecting terminal connected with the rotor assembly.

4. The DC brushless motor according to claim 3, wherein the stator assembly comprises a plastic-coated stator, three single-phase conductive assemblies, each of the single-phase conductive assemblies comprises a single-phase winding and a bridge wire, the single-phase winding is wound on the plastic-coated stator, the bridge wire is arranged inside the plastic-coated stator and electrically connected with an outlet end of the corresponding single-phase winding, and the three first connecting terminals are respectively arranged on the bridge wire of the three single-phase conductive assemblies, and are exposed from the plastic-coated stator.

5. The DC brushless motor according to claim 4, wherein the stator assembly further comprises an insulating bracket to insulate and isolate the first connecting terminal from the dividing plate, and an end of the first connecting terminal away from the bridge wire is configured to penetrate out of the plastic-coated stator and penetrate through the insulating bracket to be electrically connected with the control board.

6. The DC brushless motor according to claim 5, wherein the end of the first connecting terminal away from the bridge wire is welded on the control board.

7. The DC brushless motor according to claim 5, wherein the bridge wire is further provided with a third connecting terminal, a first end of the third connecting terminal connected with the bridge wire is located inside the plastic-coated stator, and a second end of the third connecting terminal away from the bridge wire is exposed from the plastic-coated stator.

8. The DC brushless motor according to claim 7, wherein an outlet end of the single-phase winding is spot welded to a nearest one of the first connecting terminal and the third connecting terminal.

9. The DC brushless motor according to claim 7, wherein the bridge wire, the first connecting terminal and the third connecting terminal are in an integrally formed structure.

10. The DC brushless motor according to claim 9, wherein the first connecting terminal and the third connecting terminal are both provided with a hook, and a height of the first connecting terminal is greater than a height of the third connecting terminal.

11. The DC brushless motor according to claim 4, wherein the plastic-coated stator comprises a stator main body, and a first insulator and a second insulator respectively arranged on two ends of the stator main body.

12. The DC brushless motor according to claim 3, wherein the rotor assembly comprises a rotor and a magnetic sensor arranged on the rotor, and an end of the second connecting terminal facing the first cover is electrically connected with the magnetic sensor.

13. The DC brushless motor according to claim 1, wherein the housing comprises a first cover and a second cover, the first cover and the second cover are respectively arranged at two ends of the housing body, the dividing plate is arranged at one end of the housing body and configured to block the housing body, the control board is mounted on the dividing plate, located outside the housing body and covered by the second cover, and the connecting terminal is configured to penetrate out of a through hole on the dividing plate to be electrically connected with the control board.

14. The DC brushless motor according to claim 1, wherein the first connecting terminal is provided in the concave area, and the concave area located at the first connecting terminal is provided with a through hole for the first connecting terminal to pass through.

\*  \*  \*  \*  \*